(12) United States Patent
Kirby et al.

(10) Patent No.: US 9,583,953 B2
(45) Date of Patent: Feb. 28, 2017

(54) WIRELESS POWER TRANSFER FOR PORTABLE ENCLOSURES

(71) Applicant: QUALCOMM Incorporated, San Diego, CA (US)

(72) Inventors: Miles A. Kirby, San Diego, CA (US); William H. Von Novak, San Diego, CA (US); Michael J. Mangan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1045 days.

(21) Appl. No.: 13/765,564

(22) Filed: Feb. 12, 2013

(65) Prior Publication Data

US 2013/0147429 A1 Jun. 13, 2013

Related U.S. Application Data

(62) Division of application No. 12/572,407, filed on Oct. 2, 2009, now abandoned.

(60) Provisional application No. 61/163,381, filed on Mar. 25, 2009, provisional application No. 61/152,208, filed on Feb. 12, 2009, provisional application No. 61/164,263, filed on Mar. 27, 2009, provisional application No. 61/164,399, filed on Mar. 28, 2009, provisional application No. 61/151,290, filed on Feb. 10, 2009.

(51) Int. Cl.
*H02J 7/00* (2006.01)
*H02J 7/02* (2016.01)

(52) U.S. Cl.
CPC ............ *H02J 7/0042* (2013.01); *H02J 7/025* (2013.01)

(58) Field of Classification Search
CPC .......... H02J 5/005; H02J 7/025; H02J 7/0042; H02J 7/0054
USPC ......................................... 320/107, 108, 115
See application file for complete search history.

(56) References Cited

U.S. PATENT DOCUMENTS

| 3,633,109 A | 1/1972 | Schulz |
| 4,684,869 A * | 8/1987 | Kobayashi ............. H02J 7/025 320/108 |
| 4,802,080 A | 1/1989 | Bossi et al. |

(Continued)

FOREIGN PATENT DOCUMENTS

| CN | 1119774 A | 4/1996 |
| CN | 1202754 A | 12/1998 |

(Continued)

OTHER PUBLICATIONS

International Search Report and Written Opinion—PCT/US2010/023795—International Search Authority, European Patent Office,Mar. 11, 2010.

(Continued)

*Primary Examiner* — Edward Tso
*Assistant Examiner* — Aaron Piggush
(74) *Attorney, Agent, or Firm* — Knobbe Martens Olson & Bear, LLP

(57) ABSTRACT

Exemplary embodiments are directed to portable wireless charging. A portable charging system may comprise at least one antenna positioned within a portable enclosure. The at least one antenna may be configured to receive power from a power source and wirelessly transmit power to a receive antenna coupled to a chargeable device positioned within a near-field of the at least one antenna.

28 Claims, 16 Drawing Sheets

(56) References Cited

U.S. PATENT DOCUMENTS

| | | |
|---|---|---|
| 5,201,066 A | 4/1993 | Kim |
| 5,287,112 A | 2/1994 | Schuermann |
| 5,311,198 A | 5/1994 | Sutton |
| 5,520,892 A | 5/1996 | Bowen |
| 5,539,394 A | 7/1996 | Cato et al. |
| 5,619,530 A | 4/1997 | Cadd et al. |
| 5,790,080 A | 8/1998 | Apostolos |
| 5,956,626 A | 9/1999 | Kaschke et al. |
| 5,963,144 A | 10/1999 | Kruest |
| 6,151,500 A | 11/2000 | Cardina et al. |
| 6,195,562 B1 | 2/2001 | Pirhonen et al. |
| 6,263,247 B1 | 7/2001 | Mueller et al. |
| 6,344,828 B1 | 2/2002 | Grantz et al. |
| 6,388,628 B1 | 5/2002 | Dettloff et al. |
| 6,489,745 B1 | 12/2002 | Koreis |
| 6,600,931 B2 | 7/2003 | Sutton et al. |
| 6,608,550 B2 | 8/2003 | Hayashi et al. |
| 6,664,770 B1 | 12/2003 | Bartels |
| 6,683,438 B2 | 1/2004 | Park et al. |
| 6,690,264 B2 | 2/2004 | Dalglish |
| 6,760,578 B2 | 7/2004 | Rotzoll |
| 6,809,498 B2 | 10/2004 | Nakamura et al. |
| 6,839,035 B1 | 1/2005 | Addonisio et al. |
| 6,853,629 B2 | 2/2005 | Alamouti et al. |
| 6,906,495 B2 | 6/2005 | Cheng et al. |
| 6,967,462 B1 | 11/2005 | Landis |
| 6,970,142 B1 | 11/2005 | Pleva et al. |
| 6,975,198 B2 | 12/2005 | Baarman et al. |
| 7,069,086 B2 | 6/2006 | Von Arx |
| 7,142,811 B2 | 11/2006 | Terranova et al. |
| 7,146,139 B2 | 12/2006 | Nevermann |
| 7,164,255 B2 | 1/2007 | Hui et al. |
| 7,193,578 B1 | 3/2007 | Harris et al. |
| 7,239,110 B2 | 7/2007 | Cheng et al. |
| 7,243,855 B2 | 7/2007 | Matsumoto et al. |
| 7,248,841 B2 | 7/2007 | Agee et al. |
| 7,356,588 B2 | 4/2008 | Stineman, Jr. et al. |
| 7,375,492 B2 | 5/2008 | Calhoon et al. |
| 7,378,817 B2 | 5/2008 | Calhoon et al. |
| 7,382,260 B2 | 6/2008 | Agarwal et al. |
| 7,382,636 B2 | 6/2008 | Baarman et al. |
| 7,428,438 B2 | 9/2008 | Parramon et al. |
| 7,478,108 B2 | 1/2009 | Townsend et al. |
| 7,480,907 B1 | 1/2009 | Marolia et al. |
| 7,499,722 B2 | 3/2009 | McDowell et al. |
| 7,521,890 B2 | 4/2009 | Lee et al. |
| 7,522,878 B2 | 4/2009 | Baarman |
| 7,538,666 B2 | 5/2009 | Campman |
| 7,539,465 B2 | 5/2009 | Quan |
| 7,554,316 B2 | 6/2009 | Stevens et al. |
| 7,561,050 B2 | 7/2009 | Bhogal et al. |
| 7,565,108 B2 | 7/2009 | Kotola et al. |
| 7,576,657 B2 | 8/2009 | Duron et al. |
| 7,579,913 B1 | 8/2009 | Cheng et al. |
| 7,598,704 B2 | 10/2009 | Taniguchi et al. |
| 7,605,496 B2 | 10/2009 | Stevens et al. |
| 7,609,157 B2 | 10/2009 | McFarland |
| 7,626,544 B2 | 12/2009 | Smith et al. |
| 7,629,886 B2 | 12/2009 | Steeves |
| 7,642,918 B2 | 1/2010 | Kippelen et al. |
| 7,646,343 B2 | 1/2010 | Shtrom et al. |
| 7,663,490 B2 | 2/2010 | Dishongh |
| 7,675,403 B2 | 3/2010 | Quan et al. |
| 7,741,734 B2 | 6/2010 | Joannopoulos et al. |
| 7,778,224 B2 | 8/2010 | Hayashi et al. |
| 7,792,553 B2 | 9/2010 | Fukui et al. |
| 7,793,121 B2 | 9/2010 | Lawther et al. |
| 7,812,481 B2 | 10/2010 | Iisaka et al. |
| 7,831,757 B2 | 11/2010 | Habuto et al. |
| 7,844,306 B2 | 11/2010 | Shearer et al. |
| 7,868,837 B2 | 1/2011 | Yun et al. |
| 7,924,751 B2 | 4/2011 | Dean |
| 7,952,322 B2 | 5/2011 | Partovi et al. |
| 7,994,880 B2 | 8/2011 | Chen et al. |
| 8,004,118 B2 | 8/2011 | Kamijo et al. |
| 8,073,387 B2 | 12/2011 | Maslennikov et al. |
| 8,115,448 B2 | 2/2012 | John |
| 8,169,185 B2 | 5/2012 | Partovi et al. |
| 8,301,080 B2 | 10/2012 | Baarman |
| 8,330,475 B2 | 12/2012 | Van Bezooijen et al. |
| 8,432,293 B2 | 4/2013 | Symons |
| 8,611,815 B2 | 12/2013 | Mohammadian et al. |
| 8,614,526 B2 | 12/2013 | Cook et al. |
| 8,629,650 B2 | 1/2014 | Mohammadian et al. |
| 2001/0000960 A1 | 5/2001 | Dettloff |
| 2001/0046205 A1 | 11/2001 | Easton et al. |
| 2002/0041624 A1 | 4/2002 | Kim et al. |
| 2002/0154705 A1 | 10/2002 | Walton et al. |
| 2002/0158512 A1 | 10/2002 | Mizutani et al. |
| 2003/0048254 A1 | 3/2003 | Huang |
| 2003/0078634 A1 | 4/2003 | Schulman et al. |
| 2004/0002835 A1 | 1/2004 | Nelson |
| 2004/0041669 A1 | 3/2004 | Kawai |
| 2004/0116952 A1 | 6/2004 | Sakurai et al. |
| 2004/0130425 A1 | 7/2004 | Dayan et al. |
| 2004/0130916 A1 | 7/2004 | Baarman |
| 2004/0145342 A1 | 7/2004 | Lyon |
| 2004/0154652 A1 | 8/2004 | Karapetyan |
| 2004/0166869 A1 | 8/2004 | Laroia et al. |
| 2004/0180637 A1 | 9/2004 | Nagai et al. |
| 2004/0227057 A1 | 11/2004 | Tuominen et al. |
| 2004/0245473 A1 | 12/2004 | Takayama et al. |
| 2004/0248523 A1 | 12/2004 | Nishimura et al. |
| 2005/0068009 A1 | 3/2005 | Aoki |
| 2005/0068019 A1 | 3/2005 | Nakamura et al. |
| 2005/0083881 A1 | 4/2005 | Ohwada |
| 2005/0110641 A1 | 5/2005 | Mendolia et al. |
| 2005/0116683 A1 | 6/2005 | Cheng et al. |
| 2005/0151511 A1 | 7/2005 | Chary |
| 2005/0156560 A1 | 7/2005 | Shimaoka et al. |
| 2005/0205679 A1 | 9/2005 | Alihodzic |
| 2005/0219132 A1 | 10/2005 | Charrat |
| 2005/0220057 A1 | 10/2005 | Monsen |
| 2005/0225437 A1 | 10/2005 | Shiotsu et al. |
| 2005/0239018 A1 | 10/2005 | Green et al. |
| 2005/0242183 A1 | 11/2005 | Bremer |
| 2006/0084392 A1 | 4/2006 | Marholev et al. |
| 2006/0113955 A1 | 6/2006 | Nunally |
| 2006/0114102 A1 | 6/2006 | Chang et al. |
| 2006/0131193 A1 | 6/2006 | Sherman |
| 2006/0184705 A1 | 8/2006 | Nakajima |
| 2006/0197652 A1 | 9/2006 | Hild et al. |
| 2006/0202665 A1 | 9/2006 | Hsu |
| 2006/0220863 A1 | 10/2006 | Koyama |
| 2006/0238365 A1 | 10/2006 | Vecchione et al. |
| 2006/0244568 A1 | 11/2006 | Tong et al. |
| 2007/0001816 A1 | 1/2007 | Lindley et al. |
| 2007/0004456 A1 | 1/2007 | Shimada |
| 2007/0004466 A1 | 1/2007 | Haartsen et al. |
| 2007/0017804 A1 | 1/2007 | Myrtveit et al. |
| 2007/0021140 A1 | 1/2007 | Keyes, Iv et al. |
| 2007/0026799 A1 | 2/2007 | Wang et al. |
| 2007/0029965 A1 | 2/2007 | Hui et al. |
| 2007/0072474 A1 | 3/2007 | Beasley et al. |
| 2007/0080804 A1 | 4/2007 | Hirahara et al. |
| 2007/0090790 A1 | 4/2007 | Hui |
| 2007/0091006 A1 | 4/2007 | Thober et al. |
| 2007/0109708 A1 | 5/2007 | Hussman et al. |
| 2007/0158438 A1 | 7/2007 | Fukuda et al. |
| 2007/0165475 A1 | 7/2007 | Choi et al. |
| 2007/0171811 A1 | 7/2007 | Lee et al. |
| 2007/0191075 A1 | 8/2007 | Greene et al. |
| 2007/0222681 A1 | 9/2007 | Greene et al. |
| 2007/0241977 A1 | 10/2007 | Vance |
| 2007/0279002 A1* | 12/2007 | Partovi ............... H02J 7/0027 320/115 |
| 2007/0287508 A1 | 12/2007 | Telefus |
| 2007/0290654 A1 | 12/2007 | Govari et al. |
| 2007/0296393 A1 | 12/2007 | Malpas et al. |
| 2008/0014897 A1 | 1/2008 | Cook et al. |
| 2008/0030324 A1 | 2/2008 | Bekritsky et al. |
| 2008/0049372 A1 | 2/2008 | Loke |
| 2008/0054638 A1 | 3/2008 | Greene et al. |
| 2008/0058029 A1 | 3/2008 | Sato et al. |

(56) References Cited

U.S. PATENT DOCUMENTS

| | | | |
|---|---|---|---|
| 2008/0066979 A1 | 3/2008 | Carter | |
| 2008/0067874 A1 | 3/2008 | Tseng | |
| 2008/0079396 A1 | 4/2008 | Yamazaki et al. | |
| 2008/0091350 A1 | 4/2008 | Smith et al. | |
| 2008/0114255 A1 | 5/2008 | Schwartz et al. | |
| 2008/0116847 A1 | 5/2008 | Loke et al. | |
| 2008/0122297 A1 | 5/2008 | Arai | |
| 2008/0157711 A1 | 7/2008 | Chiang et al. | |
| 2008/0165074 A1 | 7/2008 | Terry | |
| 2008/0174266 A1 | 7/2008 | Tamura | |
| 2008/0174267 A1 | 7/2008 | Onishi et al. | |
| 2008/0203815 A1 | 8/2008 | Ozawa et al. | |
| 2008/0211320 A1 | 9/2008 | Cook et al. | |
| 2008/0242337 A1 | 10/2008 | Sampath et al. | |
| 2008/0252254 A1 | 10/2008 | Osada | |
| 2008/0258679 A1 | 10/2008 | Manico et al. | |
| 2008/0261519 A1 | 10/2008 | Demarco et al. | |
| 2008/0266748 A1 | 10/2008 | Lee | |
| 2008/0278264 A1 | 11/2008 | Karalis et al. | |
| 2008/0315826 A1 | 12/2008 | Alberth, Jr. et al. | |
| 2009/0015075 A1 | 1/2009 | Cook et al. | |
| 2009/0021374 A1 | 1/2009 | Stagg | |
| 2009/0031069 A1 | 1/2009 | Habuto et al. | |
| 2009/0045772 A1 | 2/2009 | Cook et al. | |
| 2009/0058189 A1 | 3/2009 | Cook et al. | |
| 2009/0061784 A1 | 3/2009 | Cordeiro | |
| 2009/0072629 A1 | 3/2009 | Cook et al. | |
| 2009/0072782 A1 | 3/2009 | Randall | |
| 2009/0075704 A1 | 3/2009 | Wang | |
| 2009/0127937 A1 | 5/2009 | Widmer et al. | |
| 2009/0134712 A1 | 5/2009 | Cook et al. | |
| 2009/0174258 A1 | 7/2009 | Liu et al. | |
| 2009/0179502 A1* | 7/2009 | Cook | H01Q 1/248 307/104 |
| 2009/0212636 A1 | 8/2009 | Cook et al. | |
| 2009/0224609 A1 | 9/2009 | Cook et al. | |
| 2009/0243397 A1 | 10/2009 | Cook et al. | |
| 2009/0284082 A1 | 11/2009 | Mohammadian | |
| 2009/0284220 A1 | 11/2009 | Toncich et al. | |
| 2009/0284227 A1 | 11/2009 | Mohammadian et al. | |
| 2009/0284245 A1 | 11/2009 | Kirby et al. | |
| 2009/0284369 A1 | 11/2009 | Toncich et al. | |
| 2009/0286475 A1 | 11/2009 | Toncich et al. | |
| 2009/0286476 A1 | 11/2009 | Toncich et al. | |
| 2010/0023092 A1 | 1/2010 | Govari et al. | |
| 2010/0033021 A1 | 2/2010 | Bennett | |
| 2010/0038970 A1 | 2/2010 | Cook et al. | |
| 2010/0039066 A1 | 2/2010 | Yuan et al. | |
| 2010/0081378 A1 | 4/2010 | Kawamura | |
| 2010/0109445 A1 | 5/2010 | Kurs et al. | |
| 2010/0148939 A1 | 6/2010 | Yamada et al. | |
| 2010/0181841 A1 | 7/2010 | Azancot et al. | |
| 2010/0201189 A1 | 8/2010 | Kirby et al. | |
| 2010/0201201 A1 | 8/2010 | Mobarhan et al. | |
| 2010/0201202 A1 | 8/2010 | Kirby et al. | |
| 2010/0201310 A1 | 8/2010 | Vorenkamp et al. | |
| 2010/0201311 A1 | 8/2010 | Lyell Kirby et al. | |
| 2010/0201312 A1 | 8/2010 | Kirby et al. | |
| 2010/0201533 A1 | 8/2010 | Kirby et al. | |
| 2010/0213896 A1 | 8/2010 | Ishii et al. | |
| 2010/0219693 A1 | 9/2010 | Azancot et al. | |
| 2010/0225272 A1 | 9/2010 | Kirby et al. | |
| 2010/0289341 A1 | 11/2010 | Ozaki et al. | |
| 2010/0323642 A1 | 12/2010 | Morita | |
| 2010/0328044 A1 | 12/2010 | Waffenschmidt et al. | |
| 2011/0057606 A1 | 3/2011 | Saunamaki | |
| 2011/0074347 A1 | 3/2011 | Karalis et al. | |
| 2011/0133569 A1 | 6/2011 | Cheon et al. | |
| 2011/0176251 A1 | 7/2011 | Lee | |
| 2012/0007437 A1 | 1/2012 | Fells et al. | |
| 2013/0147428 A1 | 6/2013 | Kirby et al. | |
| 2013/0300358 A1 | 11/2013 | Kirby et al. | |
| 2014/0103881 A1 | 4/2014 | Mohammadian et al. | |
| 2015/0171636 A1 | 6/2015 | Toncich et al. | |
| 2015/0372503 A1 | 12/2015 | Toncich | |

FOREIGN PATENT DOCUMENTS

| | | |
|---|---|---|
| CN | 1242092 A | 1/2000 |
| CN | 1426170 A | 6/2003 |
| CN | 1460226 A | 12/2003 |
| CN | 2681368 Y | 2/2005 |
| CN | 1604426 A | 4/2005 |
| CN | 1717879 A | 1/2006 |
| CN | 1722521 A | 1/2006 |
| CN | 1723643 A | 1/2006 |
| CN | 1726656 A | 1/2006 |
| CN | 1768462 A | 5/2006 |
| CN | 1768467 A | 5/2006 |
| CN | 1808473 A | 7/2006 |
| CN | 1829037 A | 9/2006 |
| CN | 1836953 A | 9/2006 |
| CN | 1881733 A | 12/2006 |
| CN | 1906863 A | 1/2007 |
| CN | 1912786 A | 2/2007 |
| CN | 1941541 A | 4/2007 |
| CN | 1965324 A | 5/2007 |
| CN | 1977294 A | 6/2007 |
| CN | 1996352 A | 7/2007 |
| CN | 101023600 A | 8/2007 |
| CN | 101123318 A | 2/2008 |
| CN | 101136561 A | 3/2008 |
| CN | 101151766 A | 3/2008 |
| CN | 101154823 A | 4/2008 |
| CN | 101159441 A | 4/2008 |
| CN | 201044047 Y | 4/2008 |
| CN | 101233666 A | 7/2008 |
| CN | 101291268 A | 10/2008 |
| DE | 4004196 | 4/1991 |
| DE | 29710675 U1 | 8/1997 |
| DE | 10104019 | 1/2002 |
| EP | 0444416 A1 | 9/1991 |
| EP | 0689149 | 12/1995 |
| EP | 0831411 | 3/1998 |
| EP | 0878891 A2 | 11/1998 |
| EP | 0962407 A1 | 12/1999 |
| EP | 0977304 A1 | 2/2000 |
| EP | 1022677 A1 | 7/2000 |
| EP | 1050839 | 11/2000 |
| EP | 1298578 A1 | 4/2003 |
| EP | 1420357 A1 | 5/2004 |
| EP | 1454769 A1 | 9/2004 |
| EP | 1502543 A1 | 2/2005 |
| EP | 1538726 A1 | 6/2005 |
| EP | 1575184 A1 | 9/2005 |
| EP | 1585268 A2 | 10/2005 |
| EP | 1602160 A1 | 12/2005 |
| EP | 1703435 | 9/2006 |
| EP | 1713145 | 10/2006 |
| EP | 1914663 A1 | 4/2008 |
| EP | 1919091 | 5/2008 |
| EP | 2093860 A1 | 8/2009 |
| GB | 2307379 | 5/1997 |
| GB | 2380359 | 4/2003 |
| GB | 2394843 A | 5/2004 |
| GB | 2395627 | 5/2004 |
| GB | 2416633 | 2/2006 |
| GB | 2433178 | 6/2007 |
| GB | 2440571 A | 2/2008 |
| JP | 59031054 U | 2/1984 |
| JP | S62203526 A | 9/1987 |
| JP | H04317527 A | 11/1992 |
| JP | H05291991 A | 11/1993 |
| JP | 6112720 | 4/1994 |
| JP | H06133476 A | 5/1994 |
| JP | H0711035 U | 2/1995 |
| JP | H0739077 A | 2/1995 |
| JP | H0771769 A | 3/1995 |
| JP | H07131376 A | 5/1995 |
| JP | 9103037 A | 4/1997 |
| JP | 9147070 A | 6/1997 |
| JP | H09172743 A | 6/1997 |
| JP | 10145987 A | 5/1998 |
| JP | H10210751 A | 8/1998 |
| JP | H10225020 A | 8/1998 |

(56) References Cited

FOREIGN PATENT DOCUMENTS

| | | |
|---|---|---|
| JP | 10240880 A | 9/1998 |
| JP | 10295043 A | 11/1998 |
| JP | H10293826 A | 11/1998 |
| JP | 11025238 A | 1/1999 |
| JP | 11069640 A | 3/1999 |
| JP | 11098706 | 4/1999 |
| JP | 11122832 | 4/1999 |
| JP | H11134566 A | 5/1999 |
| JP | H11155245 A | 6/1999 |
| JP | 11188113 A | 7/1999 |
| JP | 11338983 A | 12/1999 |
| JP | H11341711 A | 12/1999 |
| JP | 2000037046 A | 2/2000 |
| JP | 2000050534 A | 2/2000 |
| JP | 2000057450 A | 2/2000 |
| JP | 2000501263 A | 2/2000 |
| JP | 2000067195 A | 3/2000 |
| JP | 2000076008 A | 3/2000 |
| JP | 2000113127 A | 4/2000 |
| JP | 2000138621 A | 5/2000 |
| JP | 2000172795 A | 6/2000 |
| JP | 2001238372 A | 8/2001 |
| JP | 2001511574 A | 8/2001 |
| JP | 2001291080 A | 10/2001 |
| JP | 2001309579 A | 11/2001 |
| JP | 2001339327 A | 12/2001 |
| JP | 2002034169 A | 1/2002 |
| JP | 2002050534 A | 2/2002 |
| JP | 2002506259 A | 2/2002 |
| JP | 2002513490 A | 5/2002 |
| JP | 2002529982 A | 9/2002 |
| JP | 2003011734 A | 1/2003 |
| JP | 2003047178 A | 2/2003 |
| JP | 2003224937 A | 8/2003 |
| JP | 2004007851 A | 1/2004 |
| JP | 2004096589 A | 3/2004 |
| JP | 2004135455 A | 4/2004 |
| JP | 2004159456 A | 6/2004 |
| JP | 2004166384 A | 6/2004 |
| JP | 2004526236 A | 8/2004 |
| JP | 2004274972 A | 9/2004 |
| JP | 2004297779 A | 10/2004 |
| JP | 2004306558 A | 11/2004 |
| JP | 2004336742 A | 11/2004 |
| JP | 2004355212 A | 12/2004 |
| JP | 2005110399 A | 4/2005 |
| JP | 2005110412 A | 4/2005 |
| JP | 2005135455 A | 5/2005 |
| JP | 2005159607 A | 6/2005 |
| JP | 2005204493 A | 7/2005 |
| JP | 2005520428 A | 7/2005 |
| JP | 2005208754 A | 8/2005 |
| JP | 2005224045 A | 8/2005 |
| JP | 2005525705 A | 8/2005 |
| JP | 2005261187 A | 9/2005 |
| JP | 2005267643 A | 9/2005 |
| JP | 2005303697 A | 10/2005 |
| JP | 2006060909 A | 3/2006 |
| JP | 2006081249 A | 3/2006 |
| JP | 2006510101 A | 3/2006 |
| JP | 2006141170 A | 6/2006 |
| JP | 2006149168 A | 6/2006 |
| JP | 2006174676 A | 6/2006 |
| JP | 2006517378 A | 7/2006 |
| JP | 2006217731 A | 8/2006 |
| JP | 2006230129 A | 8/2006 |
| JP | 2006238548 A | 9/2006 |
| JP | 2006254678 A | 9/2006 |
| JP | 2006295905 A | 10/2006 |
| JP | 2006296123 A | 10/2006 |
| JP | 2006314181 A | 11/2006 |
| JP | 2007006029 A | 1/2007 |
| JP | 2007043773 A | 2/2007 |
| JP | 2007089341 A | 4/2007 |
| JP | 2007104868 A | 4/2007 |
| JP | 2007109301 A | 4/2007 |
| JP | 2007514400 A | 5/2007 |
| JP | 2007166379 A | 6/2007 |
| JP | 2007221584 A | 8/2007 |
| JP | 3995724 B2 | 10/2007 |
| JP | 2007336717 A | 12/2007 |
| JP | 2007537688 A | 12/2007 |
| JP | 2008011341 A | 1/2008 |
| JP | 2008048482 A | 2/2008 |
| JP | 2008054424 A | 3/2008 |
| JP | 2008508842 A | 3/2008 |
| JP | 2008104295 A | 5/2008 |
| JP | 2008109646 A | 5/2008 |
| JP | 2008120357 A | 5/2008 |
| JP | 2008199857 A | 8/2008 |
| JP | 2008199882 A | 8/2008 |
| JP | 2008283789 A | 11/2008 |
| JP | 2008543255 A | 11/2008 |
| JP | 2008295191 A | 12/2008 |
| JP | 2009523402 A | 6/2009 |
| JP | 2009527147 A | 7/2009 |
| JP | 2010508007 A | 3/2010 |
| JP | 2010508008 A | 3/2010 |
| JP | 2010527226 A | 8/2010 |
| JP | 2011030418 A | 2/2011 |
| KR | 1019980024391 | 7/1998 |
| KR | 20000011967 A | 2/2000 |
| KR | 20040026318 A | 3/2004 |
| KR | 20040072581 A | 8/2004 |
| KR | 20050105200 A | 11/2005 |
| KR | 20070017804 A | 2/2007 |
| KR | 20070032271 A | 3/2007 |
| KR | 20080036702 A | 4/2008 |
| TW | 546960 B | 8/2003 |
| TW | 200306048 A | 11/2003 |
| TW | 200512964 | 4/2005 |
| TW | 200614626 | 5/2006 |
| TW | M294779 U | 7/2006 |
| TW | 200717963 A | 5/2007 |
| TW | M317367 U | 8/2007 |
| TW | 200820537 A | 5/2008 |
| TW | 200824215 A | 6/2008 |
| TW | M334559 U | 6/2008 |
| TW | 200830663 A | 7/2008 |
| TW | M336621 U | 7/2008 |
| TW | 200843282 A | 11/2008 |
| TW | 200901597 A | 1/2009 |
| TW | M349639 U | 1/2009 |
| TW | I347724 | 8/2011 |
| TW | I366320 | 6/2012 |
| WO | WO-9829969 | 7/1998 |
| WO | WO-9854912 | 12/1998 |
| WO | WO-9905658 A1 | 2/1999 |
| WO | WO-0027137 A1 | 5/2000 |
| WO | 0227682 | 4/2002 |
| WO | WO-02062077 A1 | 8/2002 |
| WO | WO-03044970 A2 | 5/2003 |
| WO | WO-03079524 A2 | 9/2003 |
| WO | 2004025805 A1 | 3/2004 |
| WO | WO-2004032349 | 4/2004 |
| WO | WO-2004055654 A2 | 7/2004 |
| WO | WO-2004068726 A2 | 8/2004 |
| WO | WO-2004073150 A1 | 8/2004 |
| WO | WO-2004073166 A2 | 8/2004 |
| WO | WO-2004096023 A1 | 11/2004 |
| WO | WO-2005078922 A1 | 8/2005 |
| WO | WO-2005104022 | 11/2005 |
| WO | 2006011769 A1 | 2/2006 |
| WO | 2006031133 A1 | 3/2006 |
| WO | WO-2006038167 | 4/2006 |
| WO | WO-2006068416 A1 | 6/2006 |
| WO | WO-2006101285 A1 | 9/2006 |
| WO | WO-2006127624 A2 | 11/2006 |
| WO | 2007000055 | 1/2007 |
| WO | WO-2007015599 | 2/2007 |
| WO | WO-2007044144 | 4/2007 |
| WO | WO-2007068974 A2 | 6/2007 |
| WO | WO-2007081971 A2 | 7/2007 |
| WO | WO-2007084717 A2 | 7/2007 |

(56) References Cited

FOREIGN PATENT DOCUMENTS

| WO | 2007095267 A2 | 8/2007 |
|---|---|---|
| WO | WO-2007089086 A1 | 8/2007 |
| WO | WO-2007138690 A1 | 12/2007 |
| WO | WO-2008011769 A1 | 1/2008 |
| WO | WO-2008050260 A1 | 5/2008 |
| WO | WO-2008050292 A2 | 5/2008 |
| WO | 2008072628 A1 | 6/2008 |
| WO | 2008109691 A2 | 9/2008 |
| WO | 2009140221 | 11/2009 |
| WO | WO-2009140222 A1 | 11/2009 |
| WO | WO-2009140223 | 11/2009 |

OTHER PUBLICATIONS

Taiwan Search Report—TW099104285—TIPO—Apr. 29, 2013.
Nikitin P.V., et al., "Theory and Measurement of Backscattering from RFID Tags", Antennas and Propagation Magazine, Dec. 2006, pp. 8. URL: http://www.ee.washington.edu/people/faculty/nikitin_pavel/papers/APmag_2006.pdf.
Turner C., et al., "Backscatter modulation of Impedance Modulated RFID tags", Feb. 2003, pp. 5. URL: http://www.rfip.eu/downloads/backscatter_tag_link_budget_and_modulation_at_reader_receiver.pdf.
Fan Z., et al., "Bandwidth allocation in UWB WPANs with ECMA-368 MAC", Computer Communications, Elsevier Science Publishers BV, Amsterdam, NL, vol. 32, No. 5, Mar. 27, 2009 (Mar. 27, 2009) , pp. 954-960, XP026001994, ISSN: 0140-3664, DOI: DOI:10.1016/J.COMCOM.2008.12.024 [retrieved on Dec. 30, 2008].
Yates et al., "Optimal transmission frequency for ultralow-power short-range radio links", Source: IEEE Transactions on Circuits and Systems I: Fundamental Theory and Applications,, vol. 51, No. 7, Jul. 2004, pp. 1405-1413, ISSN: 1057-7122; DOI: 10.1109/TCSI.2004.830696; Publisher: IEEE, USA Author affiliation: Dept. of Electr. & Electron. Eng., Imperial Coll. London, UK.
Want R: "The Magic of RFID" Queue, vol. 2, No. 7, Oct. 2004 (Oct. 2004), pp. 41-48, XP002585314 Internet ISSN: 1542-7730 DOI: http://doi.acm.org/10.1145/1035594.1035619.
Want R: "An introduction to RFID technology" IEEE Pervasive Computing, IEEE Service Center, Los Alamitos, CA, US LNKD-DOI:10.1109/MPRV.2006.2. vol. 5, No. 1, Jan. 1, 2006 (Jan. 1, 2006) , pp. 25-33, XP002510139ISSN: 1536-1268.

\* cited by examiner

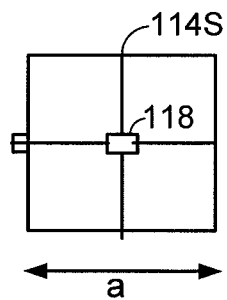
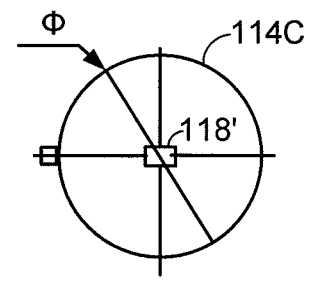
*FIG. 4A*  *FIG. 4B*
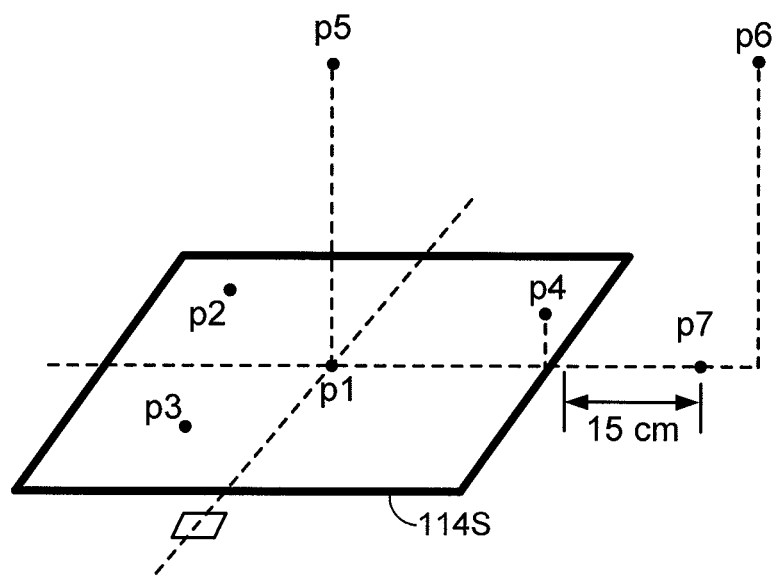
*FIG. 5*

WIRELESS POWER TRANSFER FOR PORTABLE ENCLOSURES

CROSS REFERENCE TO RELATED APPLICATIONS

This application is a divisional of U.S. patent application Ser. No. 12/572,407, filed on Oct. 2, 2009 and hereby expressly incorporated in its entirety, which claims priority benefit from:

U.S. Provisional Patent Application 61/163,381 entitled "WIRELESS CHARGING IN TRAVEL GEAR" filed on Mar. 25, 2009, and assigned to the assignee hereof and hereby expressly incorporated by reference herein;

U.S. Provisional Patent Application 61/152,208 entitled "WIRELESS POWER CHARGERS IN CARRYING CASES" filed on Feb. 12, 2009, and assigned to the assignee hereof and hereby expressly incorporated by reference herein;

U.S. Provisional Patent Application 61/164,263 entitled "PASSIVE ALIGNER FOR WIRELESS POWER" filed on Mar. 27, 2009, and assigned to the assignee hereof and hereby expressly incorporated by reference herein;

U.S. Provisional Patent Application 61/164,399 entitled "WIRELESS CHARGING" filed on Mar. 28, 2009, and assigned to the assignee hereof and hereby expressly incorporated by reference herein; and U.S. Provisional Patent Application 61/151,290 entitled "MULTIDIMENSIONAL WIRELESS CHARGER" filed on Feb. 10, 2009, and assigned to the assignee hereof and hereby expressly incorporated by reference herein.

BACKGROUND

Field

The present invention relates generally to wireless charging, and more specifically to devices, systems, and methods related to portable wireless charging systems.

Background

Typically, each battery powered device such as a wireless communication device such as a cell-phone requires its own charger and power source, which is usually the AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area. Therefore, there is a need to provide a wireless charging arrangement that accommodates flexible placement and orientation of transmit and receive antennas. In addition, it is desirable to have wireless power platforms that are mobile platforms, to enable users to charge their device while on the go.

BRIEF DESCRIPTION OF THE DRAWINGS

FIGS. 4A and 4B show layouts of loop antennas for transmit and receive antennas according to exemplary embodiments of the present invention.

FIG. 5 illustrates various placement points for a receive antenna relative to a transmit antenna to illustrate coupling strengths in coplanar and coaxial placements.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
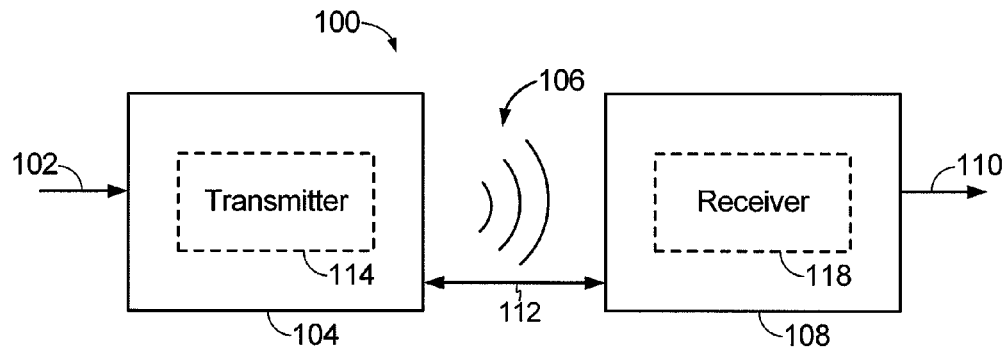
FIG. 1 illustrates a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are exactly identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
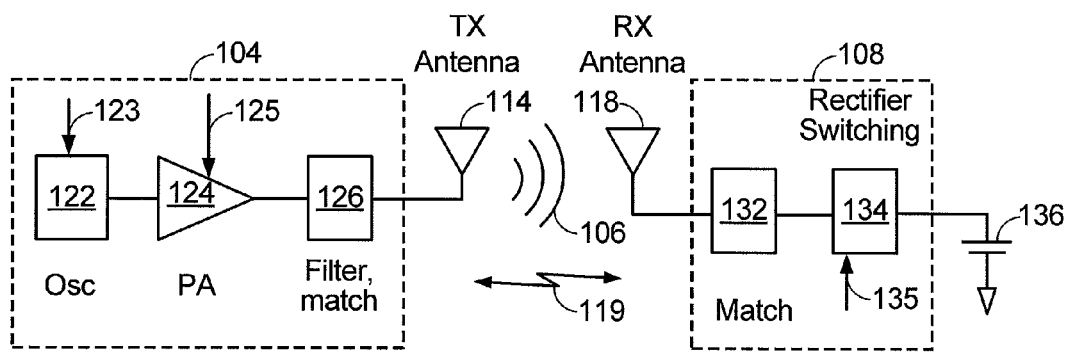
FIG. 2 depicts a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, such as 13.5 MHz, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver may include a matching circuit 132 and a rectifier and switching circuit to generate a DC power output to charge a battery 136 as shown in FIG. 2 or power a device coupled to the receiver (not shown). The matching circuit 132 may be included to match the impedance of the receiver 108 to the receive antenna 118.

Figure 3:
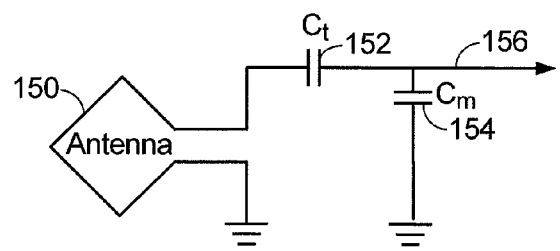
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

FIGS. 4A and 4B show layouts of loop antennas for transmit and receive antennas according to various exemplary embodiments of the present invention. Loop antennas may be configured in a number of different ways, with single loops or multiple loops at wide variety of sizes. In addition, the loops may be a number of different shapes, such as, for example only, circular, elliptical, square, and rectangular. FIG. 4A illustrates a large square loop transmit antenna 114S and a small square loop receive antenna 118 placed in the same plane as the transmit antenna 114S and near the center of the transmit antenna 114S. FIG. 4B illustrates a large circular loop transmit antenna 114C and a small square loop receive antenna 118' placed in the same plane as the transmit antenna 114C and near the center of the transmit antenna 114C.

FIG. 5 shows various placement points for a receive antenna relative to a transmit antenna to illustrate coupling strengths in coplanar and coaxial placements. "Coplanar," as used herein, means that the transmit antenna and receive antenna have planes that are substantially aligned (i.e., have surface normals pointing in substantially the same direction) and with no distance (or a small distance) between the planes of the transmit antenna and the receive antenna. "Coaxial," as used herein, means that the transmit antenna and receive antenna have planes that are substantially aligned (i.e., have surface normals pointing in substantially the same direction) and the distance between the two planes is not trivial and furthermore, the surface normal of the transmit antenna and the receive antenna lie substantially along the same vector, or the two normals are in echelon.

As examples, points p1, p2, p3, and p7 are all coplanar placement points for a receive antenna relative to a transmit antenna. As another example, point p5 and p6 are coaxial placement points for a receive antenna relative to a transmit antenna. The table below shows coupling strength (S21) and coupling efficiency (expressed as a percentage of power transmitted from the transmit antenna that reached the receive antenna) at the various placement points (p1-p7) illustrated in FIG. 5.

TABLE 1

| Position | Distance from plane (cm) | S21 efficiency (%) | Efficiency (TX DC power in to RX DC power out) |
|---|---|---|---|
| p1 | 0 | 46.8 | 28 |
| p2 | 0 | 55.0 | 36 |

TABLE 1-continued

| Position | Distance from plane (cm) | S21 efficiency (%) | Efficiency (TX DC power in to RX DC power out) |
|---|---|---|---|
| p3 | 0 | 57.5 | 35 |
| p4 | 2.5 | 49.0 | 30 |
| p5 | 17.5 | 24.5 | 15 |
| p6 | 17.5 | 0.3 | 0.2 |
| p7 | 0 | 5.9 | 3.4 |

As can be seen, the coplanar placement points p1, p2, and p3, all show relatively high coupling efficiencies. Placement point p7 is also a coplanar placement point, but is outside of the transmit loop antenna. While placement point p7 does not have a high coupling efficiency, it is clear that there is some coupling and the coupling-mode region extends beyond the perimeter of the transmit loop antenna.

Placement point p5 is coaxial with the transmit antenna and shows substantial coupling efficiency. The coupling efficiency for placement point p5 is not as high as the coupling efficiencies for the coplanar placement points. However, the coupling efficiency for placement point p5 is high enough that substantial power can be conveyed between the transmit antenna and a receive antenna in a coaxial placement.

Placement point p4 is within the circumference of the transmit antenna but at a slight distance above the plane of the transmit antenna in a position that may be referred to as an offset coaxial placement (i.e., with surface normals in substantially the same direction but at different locations) or offset coplanar (i.e., with surface normals in substantially the same direction but with planes that are offset relative to each other). From the table it can be seen that with an offset distance of 2.5 cm, placement point p4 still has relatively good coupling efficiency.

Placement point p6 illustrates a placement point outside the circumference of the transmit antenna and at a substantial distance above the plane of the transmit antenna. As can be seen from the table, placement point p7 shows little coupling efficiency between the transmit and receive antennas.

Figure 6:
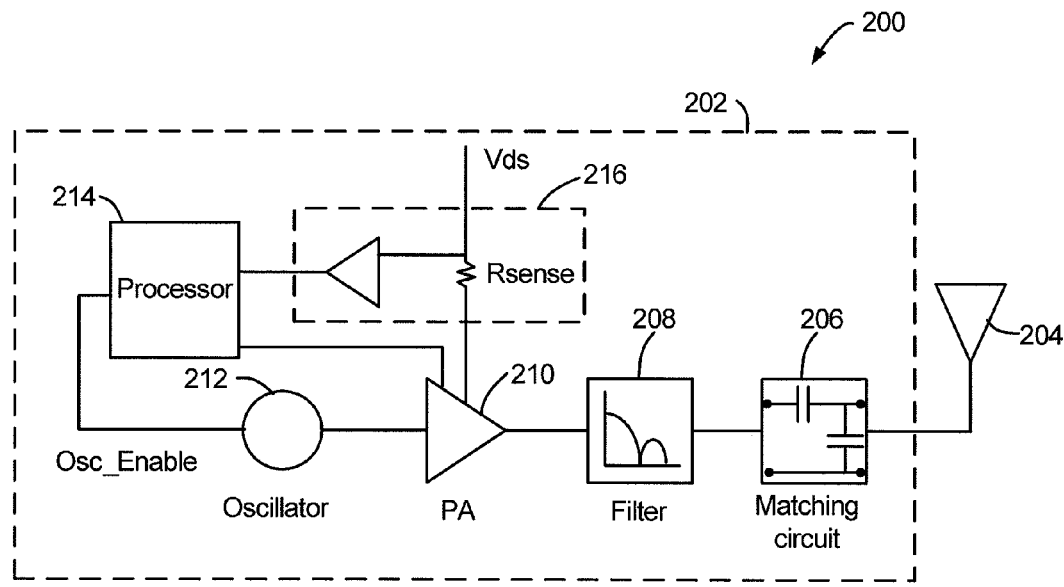
FIG. 6 is a simplified block diagram of a transmitter, in accordance with an exemplary embodiment of the present invention.

FIG. 6 is a simplified block diagram of a transmitter, in accordance with an exemplary embodiment of the present invention. A transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example only, transmitter 200 may operate at the 13.56 MHz ISM band.

Transmit circuitry 202 may include a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a processor 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by processor 214 for use in determining whether to enable the oscillator 212 for transmitting energy to communicate with an active receiver. Transmit antenna 204 may be implemented as an antenna strip with the thickness, width and metal type selected to keep resistive losses low.

Figure 7:
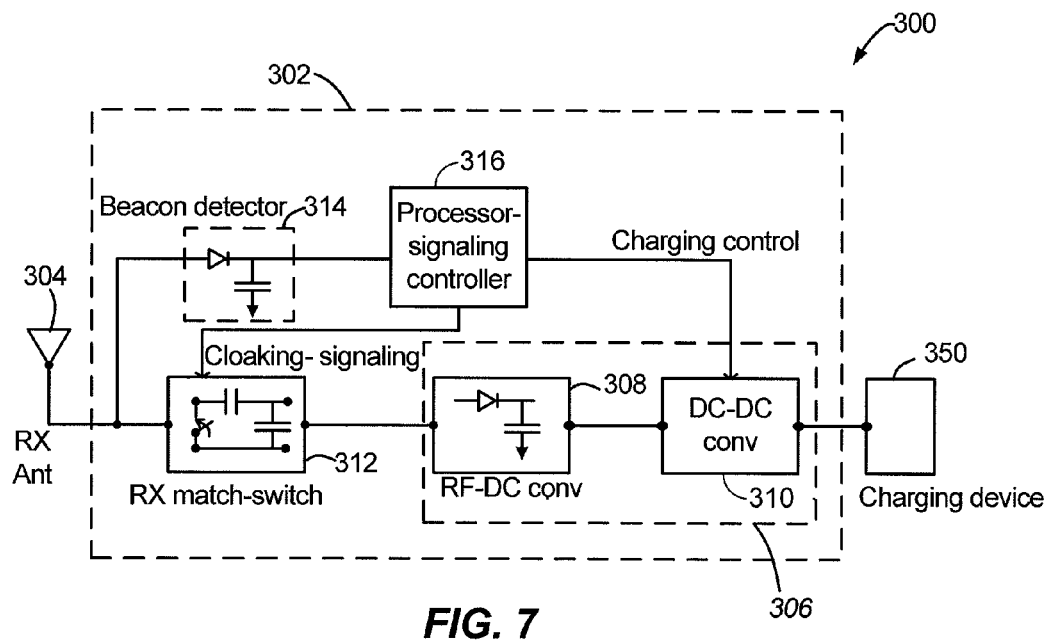
FIG. 7 is a simplified block diagram of a receiver, in accordance with an exemplary embodiment of the present invention.

FIG. 7 is a block diagram of a receiver, in accordance with an exemplary embodiment of the present invention. A receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 6). Receive antenna 304 may be similarly dimensioned with transmit antenna 204 or may be differently sized based upon the dimensions of an associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2) as is explained more fully below. As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a Device Sensing and Charging Control Mechanism, rather than conventional two-way communication. In other words, the transmitter uses on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 8:
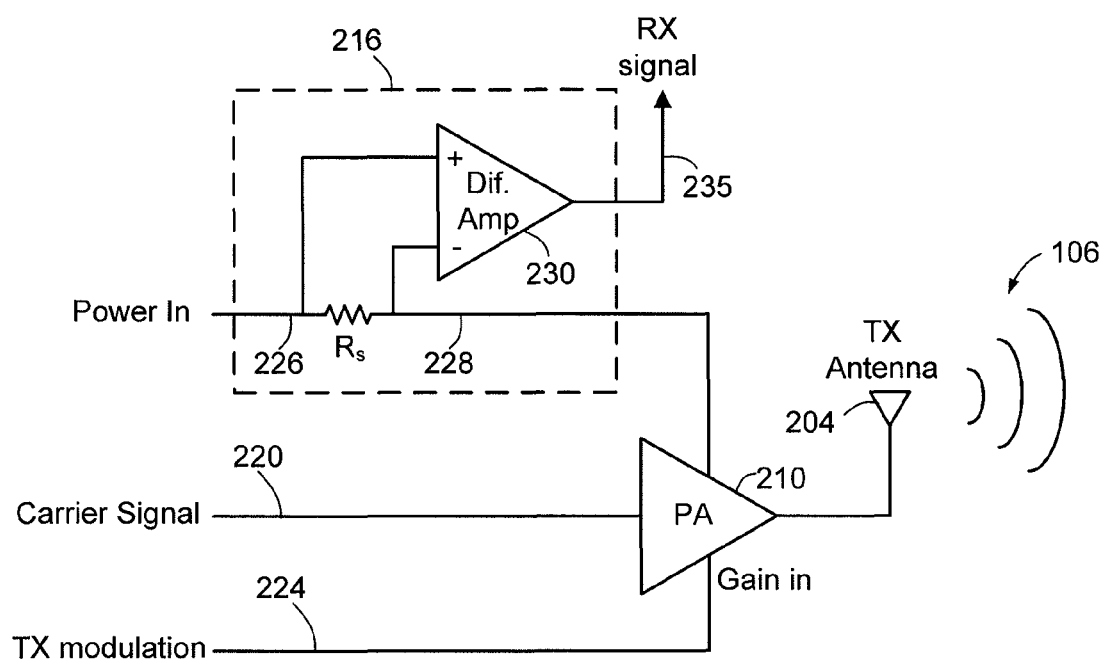
FIG. 8 depicts a simplified schematic of a portion of transmit circuitry for carrying out messaging between a transmitter and a receiver.

FIG. 8 shows a simplified schematic of a portion of transmit circuitry for carrying out messaging between a transmitter and a receiver. In some exemplary embodiments of the present invention, a means for communication may be enabled between the transmitter and the receiver. In FIG. 8, a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 8 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 7) the amount of current drawn by the power amplifier 210 will change. In other words, if no coupled mode resonance exist for the transmit antenna 210, the power required to drive the radiated field will be first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna, as explained below. Additionally, a change in receiver current draw will be observable in the transmitter's power amplifier current draw, and this change can be used to detect signals from the receive antennas, as explained below.

Figure 9A:
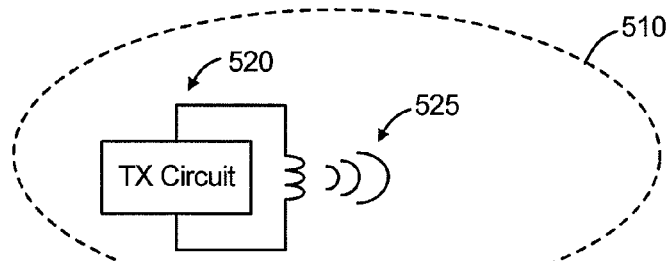
FIGS. 9A-9D are simplified block diagrams illustrating a beacon power mode for transmitting power between a transmitter and a receiver.

FIGS. 9A-9D are simplified block diagrams illustrating a beacon power mode for transmitting power between a transmitter and a one or more receivers. FIG. 9A illustrates a transmitter 520 having a low power "beacon" signal 525 when there are no receive devices in the beacon coupling-mode region 510. The beacon signal 525 may be, as a non-limiting example, such as in the range of ~10 to ~20 mW RF. This signal may be adequate to provide initial power to a device to be charged when it is placed in the coupling-mode region.

Figure 9B:
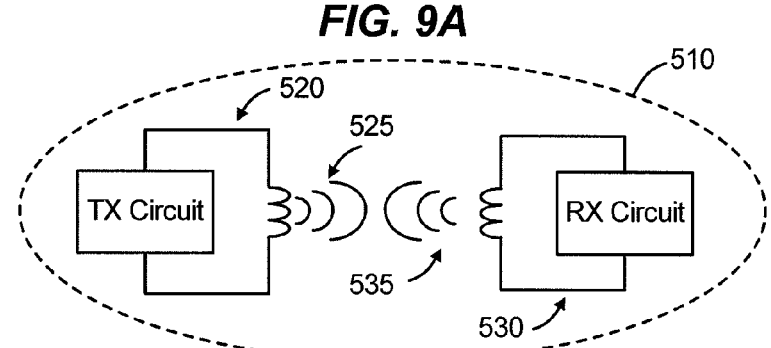

FIG. 9B illustrates a receive device 530 placed within the beacon coupling-mode region 510 of the transmitter 520 transmitting the beacon signal 525. If the receive device 530 is on and develops a coupling with the transmitter it will generate a reverse link coupling 535, which is really just the receiver accepting power from the beacon signal 525. This additional power, may be sensed by the load sensing circuit 216 (FIG. 7) of the transmitter. As a result, the transmitter may go into a high power mode.

Figure 9C:
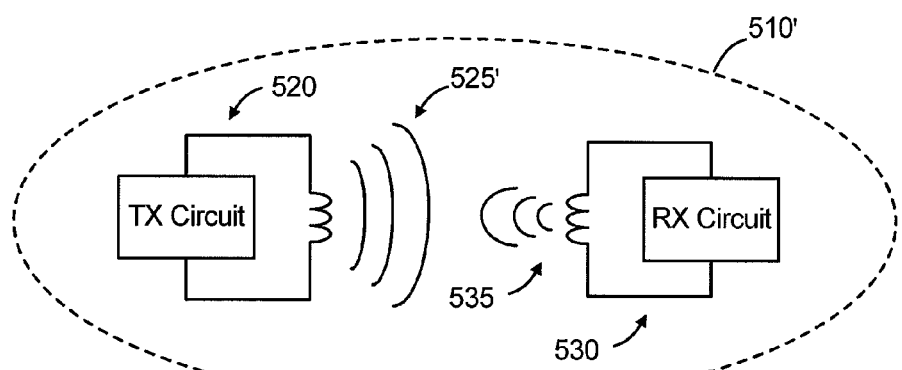

FIG. 9C illustrates the transmitter 520 generating a high power signal 525' resulting in a high power coupling-mode region 510'. As long as the receive device 530 is accepting power and, as a result, generating the reverse link coupling 535, the transmitter will remain in the high power state. While only one receive device 530 is illustrated, multiple receive devices 530 may be present in the coupling-mode region 510. If there are multiple receive device 530 they will share the amount of power transmitted by the transmitter based on how well each receive device 530 is coupled. For example, the coupling efficiency may be different for each receive device 530 depending on where the device is placed within the coupling-mode region 510.

Figure 9D:
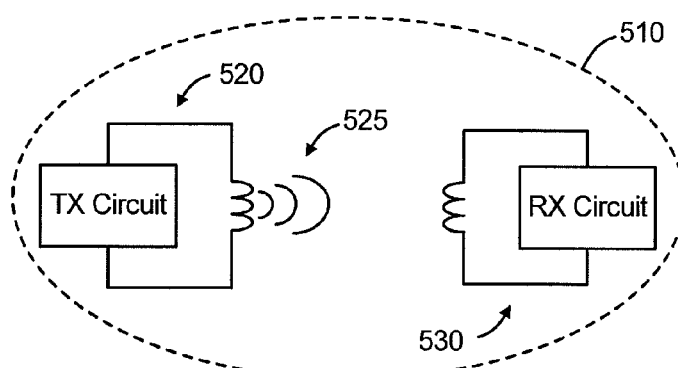

FIG. 9D illustrates the transmitter 520 generating the beacon signal 525 even when a receive device 530 is in the beacon coupling-mode region 510. This state may occur when receive device 530 is shut off, or the device cloaks itself, perhaps because it does not need any more power.

A receiver and a transmitter may communicate on a separate communication channel (e.g., Bluetooth, zigbee, etc). With a separate communication channel, the transmitter may determine when to switch between beacon mode and high power mode, or create multiple power levels, based on the number of receive devices in the coupling-mode region 510 and their respective power requirements.

Exemplary embodiments of the invention include enhancing the coupling between a relatively large transmit antenna and a small receive antenna in the near-field power transfer between two antennas through introduction of additional antennas into the system of coupled antennas that will act as repeaters and will enhance the flow of power from the transmitting antenna toward the receiving antenna.

In an exemplary embodiment, one or more extra antennas (illustrated below) are used that couple to the transmit antenna and receive antenna in the system. These extra antennas comprise repeater antennas, such as active or passive antennas. A passive antenna may include simply the antenna loop and a capacitive element for tuning a resonant frequency of the antenna. An active element may include, in addition to the antenna loop and one or more tuning capacitors, an amplifier for increasing the strength of a repeated near-field radiation.

The combination of the transmit antenna and the repeater antennas in the power transfer system may be optimized such that coupling of power to very small receive antennas is enhanced based on factors such as termination loads, tuning components, resonant frequencies, and placement of the repeater antennas relative to the transmit antenna.

A single transmit antenna exhibits a finite near-field coupling-mode region. Accordingly, a user of a device charging through a receiver in the transmit antenna's near-field coupling-mode region may require a considerable user access space that would be prohibitive or at least inconvenient. Furthermore, the coupling-mode region may diminish quickly as a receive antenna moves away from the transmit antenna.

A repeater antenna may refocus and reshape a coupling-mode region from a transmit antenna to create a second coupling-mode region around the repeater antenna, which may be better suited for coupling energy to a receive antenna.

Figure 10:
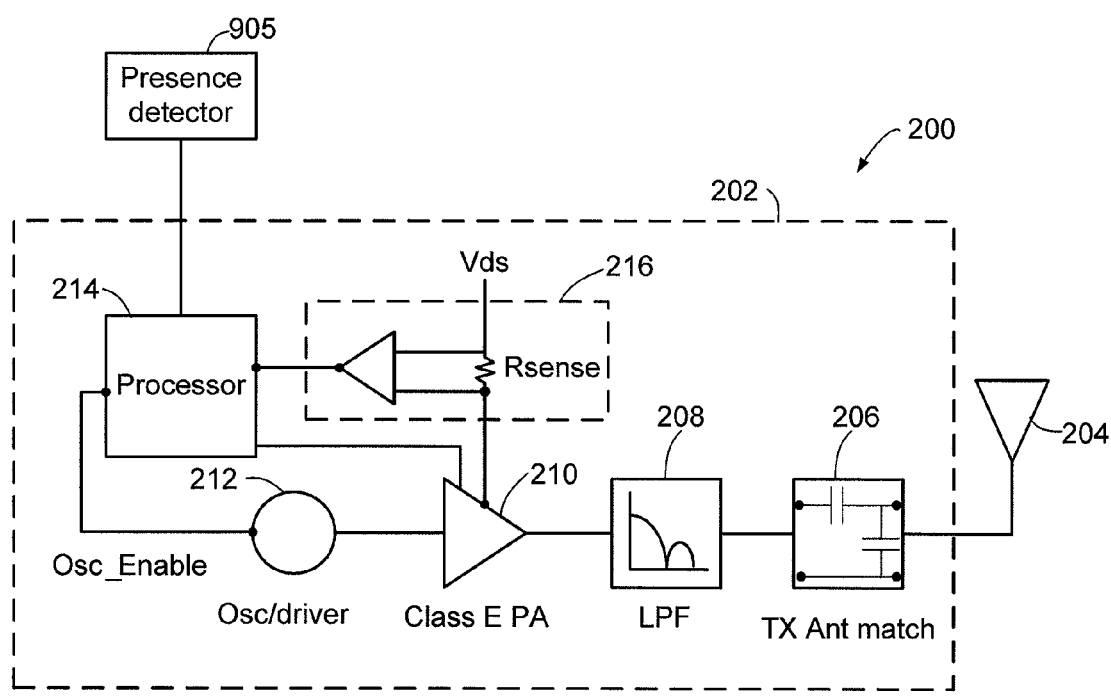
FIG. 10 is a simplified block diagram of a transmitter including a presence detector.

FIG. 10 is a simplified block diagram of a transmitter 200 including a presence detector 905. The transmitter is similar to that of FIG. 6 and, therefore, does not need to be explained again. However, in FIG. 10, the transmitter 200 includes a presence detector 905 connected to the processor 214 (also referred to as a controller herein). The processor 214 can adjust an amount of power delivered by the amplifier 210 in response to signals from the presence detector 905.

As a non-limiting example, the presence detector may be a motion detector utilized to sense the initial presence of a device to be charged that is inserted into the coverage area of the transmitter. After detection, the transmitter is turned on and the RF power received by the device is used to toggle a switch on the Rx device in a pre-determined manner, which in turn results in changes to the driving point impedance of the transmitter.

As another non-limiting example, the presence detector may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

In many of the examples below, only one guest device is shown being charged. In practice, a multiplicity of the devices can be charged from a near-field generated by each host.

In exemplary embodiments, a method by which the Tx circuit does not remain on indefinitely may be used. In such an exemplary embodiment, the Tx circuit may be programmed to shut off after a pre-determined amount of time, which may be user-defined or factory preset. This feature prevents the Tx circuit, notably the power amplifier, from running long after the wireless devices in its perimeter are fully charged. This event may be due to the failure of the circuit to detect the signal sent from either the repeater or the Rx coil that a device is fully charged. To prevent the Tx circuit from automatically shutting down if another device is placed in its perimeter, the Tx circuit automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Exemplary embodiments of the invention include using portable apparatuses as the charging stations or "hosts," housing totally, or partially, the transmit antenna and other circuitry necessary for wireless transfer of power to other often smaller devices, equipment, or machines referred to as "guests." As non-limiting examples, these charging stations or hosts could be backpacks, briefcases, purses, clothing, luggage, and so on. The charging system, which can be at least partially embedded in the aforementioned examples, may either be a retrofit to existing apparatus, or made as part of its initial design and manufacturing.

In the exemplary embodiments described herein, multi-dimensional regions with multiple antennas may be performed by the techniques described herein. In addition, multi-dimensional wireless powering and charging may be employed, such as the means described in U.S. patent application Ser. No. 12/567,339, entitled "SYSTEMS AND METHOD RELATING TO MULTI-DIMENSIONAL WIRELESS CHARGING" filed on Sep. 25, 2009, the contents of which are hereby incorporated by reference in its entirety for all purposes.

Figure 11:
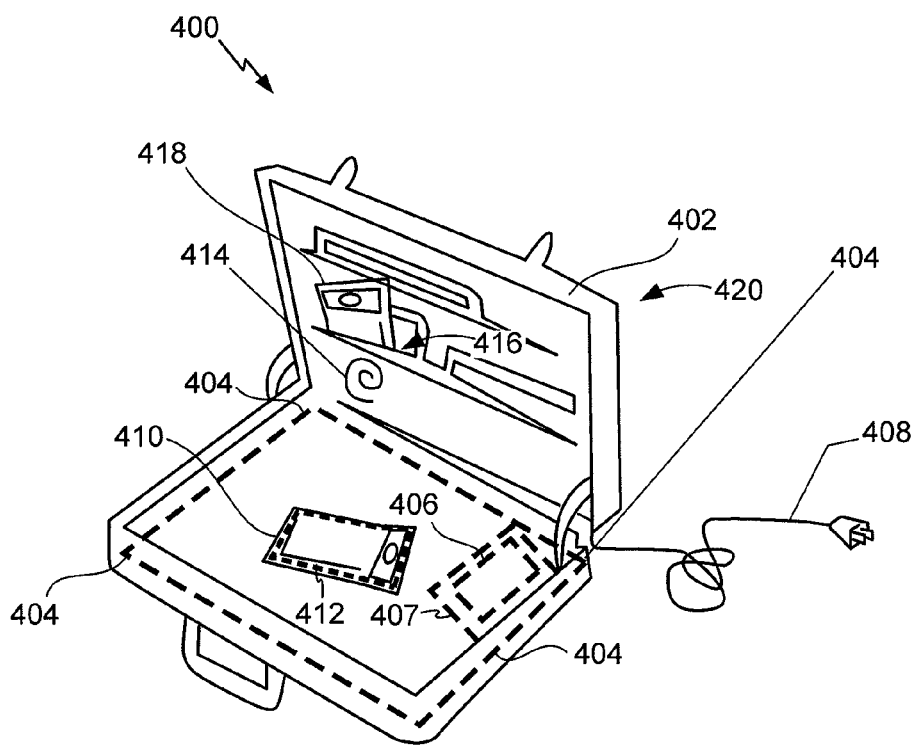
FIG. 11 depicts a portable charging system having at least one transmit antenna, in accordance with an exemplary embodiment of the present invention.

FIG. 11 depicts a portable charging system 400 including a portable enclosure, container or other portable device illustrated as a bag 402 having a transmit antenna 404 coupled thereto, in accordance with one or more exemplary embodiments of the present invention. Bag 402 may comprise any portable bag such as, for example only, a backpack, a purse, a piece of luggage, or a briefcase. It is noted that although various exemplary embodiments of the present invention are depicted in the drawings as being implemented with a specific bag type (e.g., a briefcase), exemplary embodiments described herein may be implemented in any known and suitable portable device such as a portable bag. Portable charging system 400 may also include a battery 406 integrated within bag 402. Battery 406 may be operably coupled to transmit antenna 404 via transmit circuitry 202 (see FIG. 6) and may be configured to supply power to transmit antenna 404 via transmit circuitry 202. Battery 406 may comprise any known and suitable chargeable battery, replaceable battery, or any combination thereof. Additionally, charging system 400 may include a receive antenna 407 positioned proximate battery 406 to enable for wireless charging of battery 406 via an external transmit antenna (not shown).

Furthermore, charging system 400 may include a power connector 408 configured to couple an external power source (not shown), such as a power outlet, to transmit antenna 404 via transmit circuitry 202, to battery 406, or any combination thereof. Accordingly, power connector 408 may be configured to supply power to transmit antenna 404 via transmit circuitry 202, supply power for charging battery 406, or any combination thereof. Power connector 408 may comprise any known, suitable power source connector. As a non-limiting example, power connector 408 may comprise a removable power cord configured to couple to an electrical connector (e.g., a USB port or an external power plug) on bag 402. Furthermore, power connector 408 may comprise, for example only, a retractable power cord configured to retract into bag 402 and be pulled out from bag 402.

In one contemplated operation, transmit antenna 404 may receive, via transmit circuitry 202, power from the external power source by means of power connector 408, battery 406, or any combination thereof and, upon receipt of power, may transmit power within a near-field of transmit antenna 404. The power may then be received by a receive antenna within a coupling mode-region of the receive antenna and transmit antenna 404. For example, power transmitted from transmit antenna 404 may be received by a receive antenna 410 coupled to a battery (e.g., battery 136 of FIG. 2) within chargeable device 412. More specifically, power transmitted from transmit antenna 404 may be received by receive antenna 410 and a receiver, such as receiver 108 of FIG. 2, which is coupled to a battery of chargeable device 412. As non-limiting examples, device 412 may comprise a cellular telephone, a portable media player, a camera, a gaming device, a navigation device, a headset (e.g., a Bluetooth headset), a tool, a toy, or any combination thereof. It is noted that transmit antenna 404 may be configured to simultaneously transmit power to one or more receive antennas within a near-field of transmit antenna 404. It is further noted that, according to one exemplary embodiment, transmit antenna 404 may be configured to transmit power within its near-field only if at least one device is within the near-field and the at least one device is in need of a charge.

Figure 21:
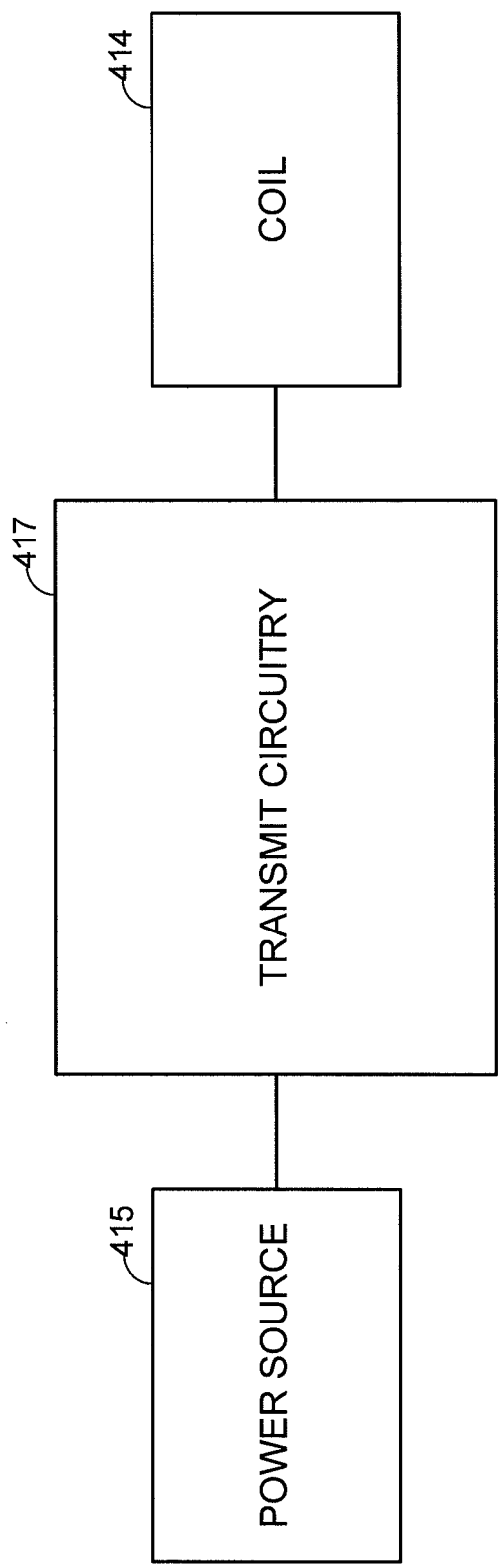
FIG. 21 is a block diagram of a coil and associated coil transmit circuitry, in accordance with an exemplary embodiment of the present invention.

Additionally, charging system 400 may include a coil 414 integrated within bag 402 and positioned proximate a storage area 416 (e.g., a pocket) of bag 402. With reference to FIG. 11 and FIG. 21, coil 414 may be configured to receive power, via coil transmit circuitry 417, from a power source 415 (e.g., via power connector 408, battery 406, or any combination thereof) and generate a field according to coil transmit circuitry 417. Furthermore, coil 414 may be configured to transmit power, via inductive coupling, to a receiver positioned within storage area 416 and adequately aligned with coil 414. For example only, coil 414 may be configured to transmit power, via inductive coupling, to a battery (not shown) within device 418, which is positioned within storage area 416. According to one exemplary embodiment of the present invention, coil 414 may be configured to transmit power only if a device is proximate thereto and in need of a charge. It is noted that although charging system 400 only includes one coil and one transmit antenna, a charging system having one or more coils and/or one or more transmit antennas is within the scope of the present invention. As an example, each pocket within bag 402 may have an associated coil proximate thereto. Furthermore, as an example, a lid 420 and a base 422 of bag 402 may each include an associated transmit antenna.

Accordingly, while bag 402 is coupled to an external power source (e.g., a power outlet), one or more devices (e.g., device 412) within bag 402 may wirelessly receive power from the external source via power connector 408 and transmit antenna 404, and one or more devices (e.g., device 418) within bag 402 may wirelessly receive power from the external source via power connector 408 and coil 414. Furthermore, while bag 402 is coupled to the external power source, battery 406 may be charged with power received from the external source via power connector 408. In addition, while bag 402 is not coupled to the external power source, one or more devices (e.g., device 412) within bag 402 may wirelessly receive power, via associated receive circuitry, from battery 406 via transmit antenna 404 and transmit circuitry 202. Furthermore, one or more devices (e.g., device 418) within bag 402 may wirelessly receive power from battery 406 via an associated coil. Moreover, it is noted that battery 406 may be configured to wirelessly receive power from a transmit antenna external to bag 402.

Figure 12:
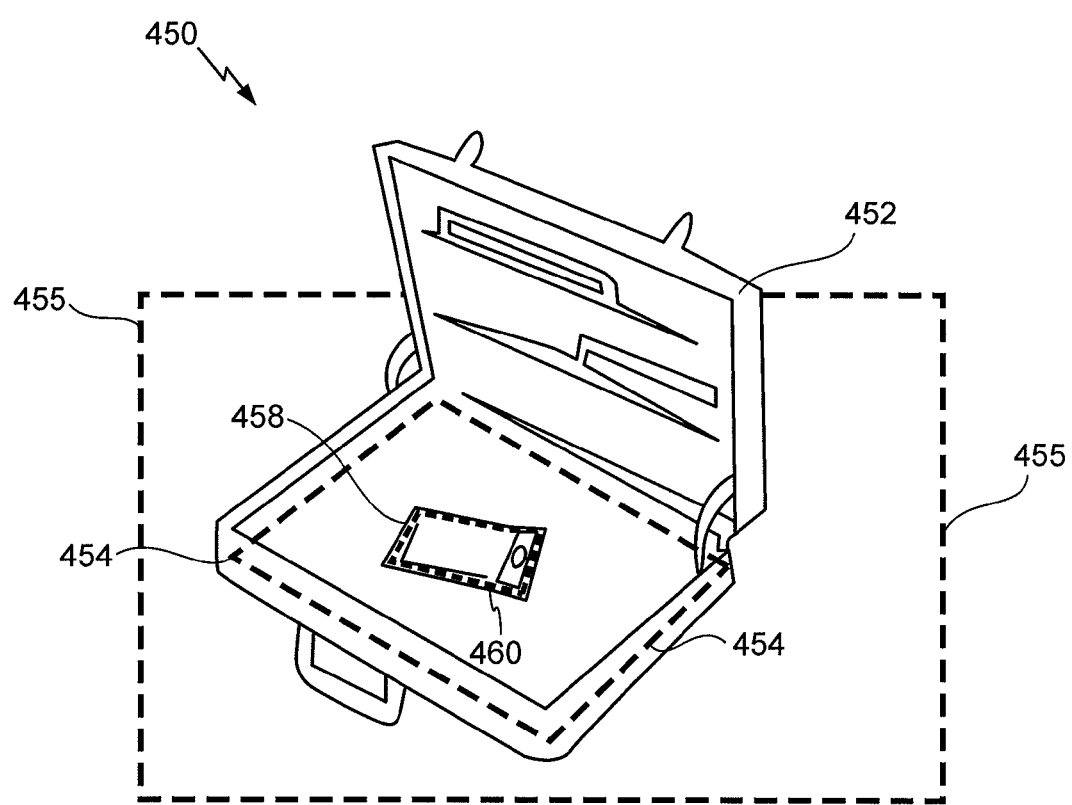
FIG. 12 illustrates a portable charging system having at least one repeater antenna, according to an exemplary embodiment of the present invention.

FIG. 12 depicts another portable charging system 450 including a portable device illustrated as a bag 452 having a repeater antenna 454 integrated therein. Similarly to bag 402, bag 452 may comprise any known and suitable portable bag. Repeater antenna 454 may be configured to refocus and reshape a coupling-mode region from a transmit antenna to create a second coupling-mode region around repeater antenna 454, which may be better suited for coupling energy to a receive antenna. In one contemplated operation, repeater antenna 454 may receive power transmitted from a transmit antenna external to bag 452. For example, repeater antenna 454 may receive power transmitted from transmit antenna 455, which may be, for example, integrated within a table (not shown). Upon receipt of power, repeater antenna 454 may transmit power within a near-field of repeater antenna 454 and the power may be received by a receiver within an associated coupling-mode region. For example, power wirelessly transmitted from repeater antenna 454 may be received by receive antenna 458 coupled to a battery (e.g., battery 136 of FIG. 2) within device 460. More specifically, power wirelessly transmitted from repeater antenna 454 may be received by receive antenna 458 and a receiver, such as receiver 108 (see FIG. 2), which may be coupled to a battery within device 460. As described above, utilizing a repeater antenna may increase the charging rate of a device by refocusing a coupling-mode region, reshaping a coupling-mode region, or any combination thereof. Furthermore, according to one exemplary embodiment of the present invention, repeater antenna 454 may be configured to transmit power within its near-field only if at least one device is within the near-field and the at least one device is in need of a charge.

Figure 13A:
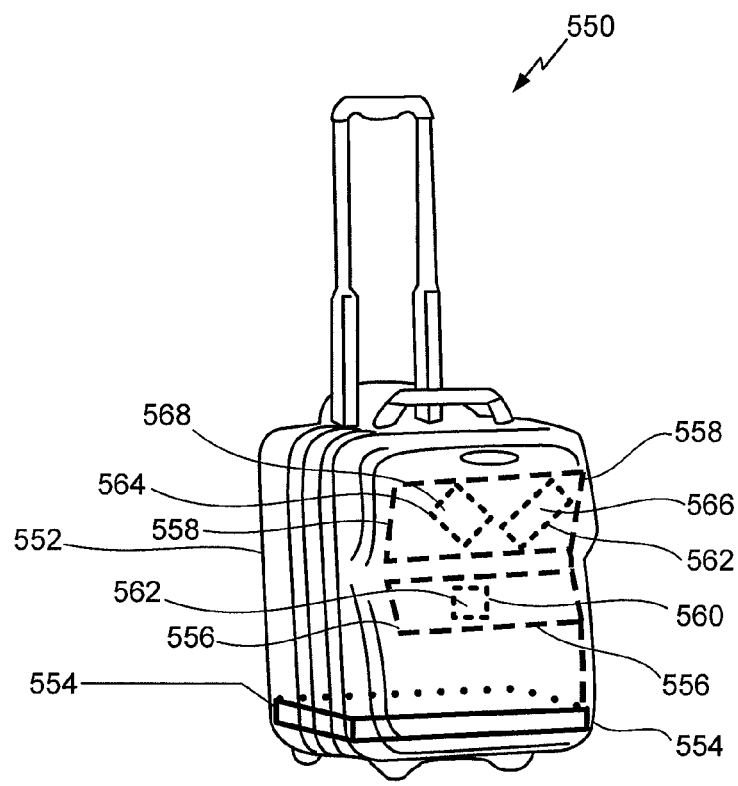
FIGS. 13A-13C each illustrate a portable charging system having a plurality of transmit antennas, in accordance with an exemplary embodiment of the present invention.
Figure 13B:
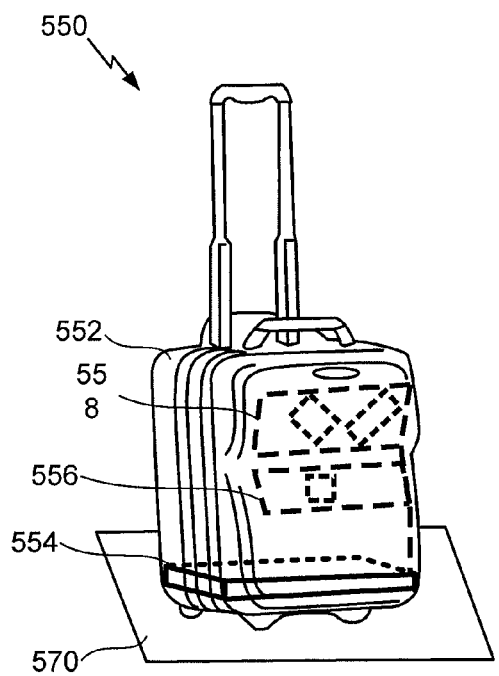
Figure 13C:
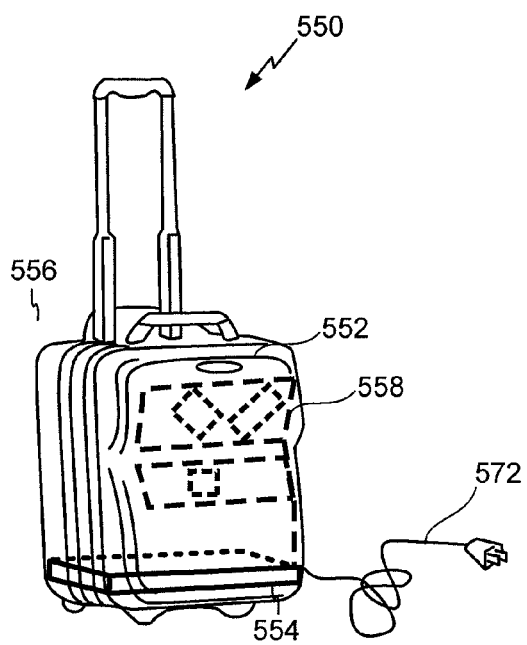

FIGS. 13A-13C illustrate another portable charging system 550 including a plurality of transmit antennas 556, 558 and a battery 554 integrated within a portable device illustrated as a bag 552. For example only, battery 554 may comprise a chargeable battery, a replaceable battery, or any combination thereof. As noted below, battery 554 may be configured to receive power from an external transmit antenna via a receive antenna and receive circuitry 302 (see FIG. 7) coupled to battery 554.

As depicted in FIG. 13A, a first transmit antenna 556 and a second transmit antenna 558 are each operably coupled to battery 554 via receive circuitry 302 and are each configured to receive power from battery 554 via receive circuitry 302. Moreover, first transmit antenna 556 and a second transmit antenna 558 may each be configured to transmit power within a respective near-field. More specifically, first transmit antenna 556 may be configured to wirelessly transmit power that may be received by a one or more receive antennas positioned within a near-field of first transmit antenna 556, and second transmit antenna 558 may be configured to wirelessly transmit power that may be received by one or more receive antennas positioned within a near-field of second transmit antenna 558. For example, power transmitted from first transmit antenna 556 may be received by receive antenna 560 coupled via receive circuitry 302 to a battery (not shown) within a device 562. Furthermore, for example, power transmitted from second transmit antenna 558 may be received by a first receive antenna 562 coupled via receive circuitry 302 to a battery (not shown) within a device 566 and a second receive antenna 564 coupled via receive circuitry 302 to a battery (not shown) within a device 568. Although only two transmit antenna are depicted within charging system 550, charging system 550 may include any number of transmit antennas integrated within a portable bag.

As illustrated in FIG. 13B, charging system 550 may also include a transmit antenna 570 external to bag 552 and configured to receive power from an external source (not shown) and transmit power to, and thus charge, battery 554. Furthermore, in this depicted exemplary embodiment, transmit antenna 556 and transmit antenna 558 may be configured as repeater antennas and, therefore, transmit antenna 570 may also be configured to provide power via transmit circuitry 202 to each of first transmit antenna 556 and second transmit antenna 558. Furthermore, each of first transmit antenna 556 and second transmit antenna 558 may then transmit power to one or more receive antennas positioned within an associated near-field. In addition, charging system 550 may include a repeater antenna 557 oriented at an angle with respect to a longitudinal axis of bag 552. Repeater antenna 557 may be configured to receive power from transmit antenna 570 and convey power to one or more receive antennas positioned with an associated near-field.

Furthermore, as illustrated in FIG. 13C, charging system 550 may include a power connector 572 configured to couple an external power source (not shown), such as a power outlet, to first transmit antenna 556, second transmit antenna 558, battery 554, or any combination thereof. Accordingly, power connector 572 may be configured to supply power via transmit circuitry 202 to first transmit antenna 556, second transmit antenna 558, or any combination thereof. Furthermore, power connector 572 may be configured to supply power to battery 554. Similarly to power connector 408 described above with reference to FIG. 11, power connector 572 may comprise any known, suitable power source connector. For example only, power connector 572 may comprise a removable power cord configured to couple to an electrical connector (e.g., a USB port or an external power plug) on bag 552. Furthermore, power connector 572 may comprise, for example only, a retractable power cord configured to retract into bag 552 and be pulled out from bag 552. It is noted that transmit antenna 556 and transmit antenna 558 may each be configured to transmit power within a respective near-field only if at least one device is positioned within the near-field and at least one device is in need of a charge.

Figure 14A:
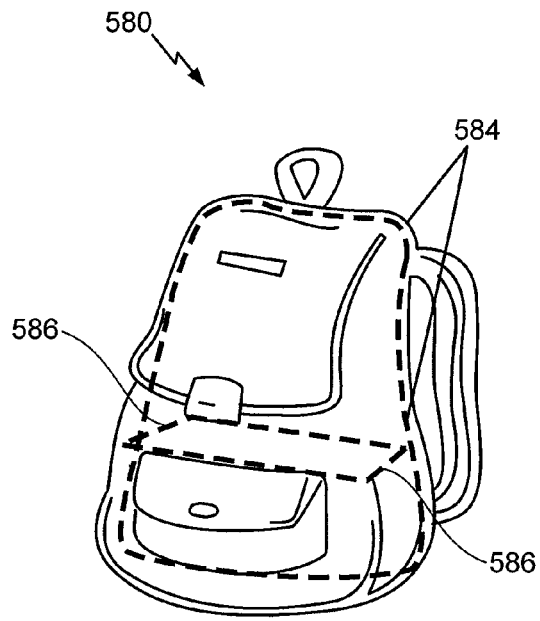
FIGS. 14A and 14B each depict a portable charging system including transmit antennas oriented in differing planes, according to an exemplary embodiment of the present invention.
Figure 14B:
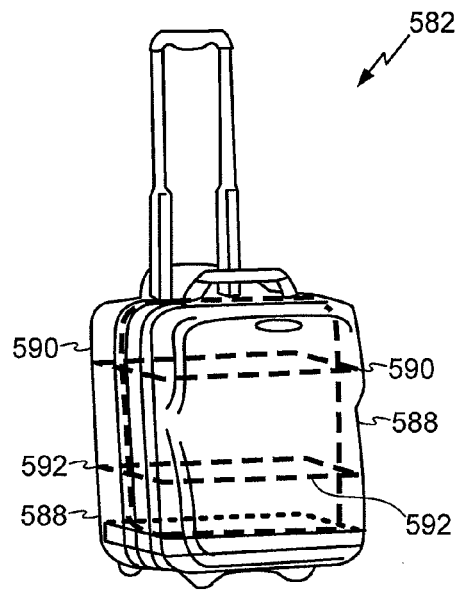

Although charging system 550 depicts a plurality of transmit antennas wherein each transmit antenna is oriented in a substantially similar plane, other exemplary embodiments of the present invention may include a plurality of transmit antennas integrated within a portably bag and having substantially differing orientations. For example, FIGS. 14A and 14B respectively illustrate portable charging systems 580 and 582, each including transmit antennas oriented in differing planes. More specifically, charging system 580 includes a first transmit antenna 586 oriented in a lateral plane and a second transmit antenna 584 oriented in a vertical plane perpendicular to the orientation of first transmit antenna 586.

Furthermore, another charging system 582 includes a first transmit antenna 590 oriented in a first lateral plane and a second transmit antenna 592 oriented in a second lateral plane parallel to the first lateral plane. Moreover, charging system 582 includes a third transmit antenna 588 oriented in a vertical plane perpendicular to the orientations of each of first transmit antenna 590 and second transmit antenna 592. It is noted that, although transmit antennas within charging systems 580 and 582 are depicted as being oriented in either a substantially vertical orientation or a substantially lateral orientation, transmit antennas oriented at an angle from a horizontal plane or a vertical plane are within the scope of the present invention. Orienting transmit antennas in differing orientations may more effectively provide power to receive antennas positioned in various orientations.

As will be understood by one of ordinary skill in the art, concurrent operation of directly or nearly adjacent antennas may result in interfering effects between the concurrently activated and physically nearby or adjacent antennas. As such, a means may be used for selecting and multiplexing between directly or nearly adjacent antennas so as to minimize interfering effects. For example, independent activation of directly or nearly adjacent antennas may be controlled by a controller and may occur according to a time-domain based sequence. More specifically, a multiplexer may time-multiplex an output signal from an amplifier to each of the antennas. Furthermore, upon activation of one antenna, adjacent antennas may be "cloaked" to allow improved wireless charging efficiency of the activated antenna.

Figure 15:
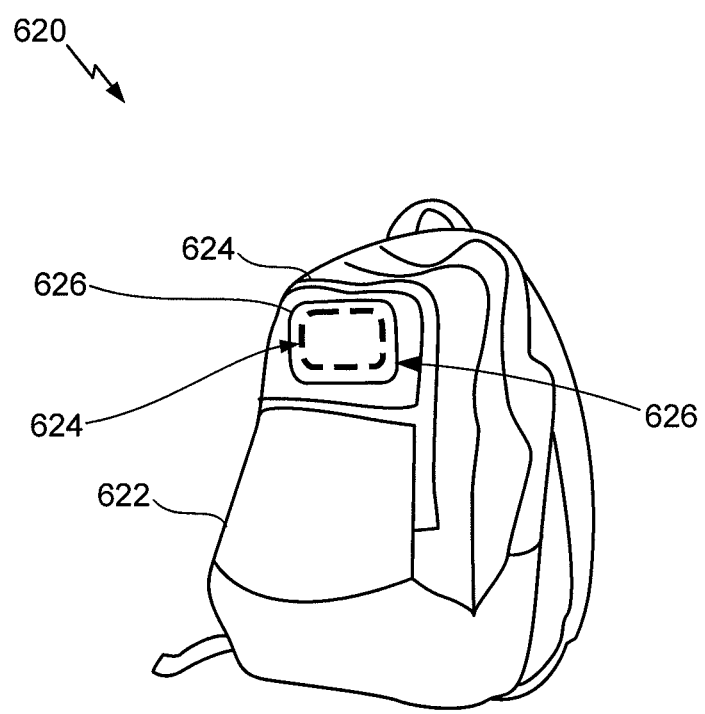
FIG. 15 illustrates a portable charging system having transmit antenna positioned proximate a pocket of a portable device, in accordance with an exemplary embodiment of the present invention.

Additionally, as illustrated in FIG. 15, another charging system 620 may include a portable device illustrated as a bag 622 having a transmit antenna 624 positioned proximate a storage area 626 (e.g., a pocket) of bag 622. Transmit antenna 624 may be configured to receive power from a battery (not shown) integrated within bag 622, an external power source (not shown), or any combination thereof. Furthermore, transmit antenna 624 may be configured as a repeater antenna configured to wirelessly receive power from another transmit antenna (not shown) either external to or integrated within bag 622. Upon receipt of power, transmit antenna 624 may wirelessly transmit power that may be received by a receiver within an associated coupling-mode region. For example, power transmitted from transmit antenna 624 may be received by a receive antenna coupled to a battery (not shown) of a device positioned within storage area 626. According to one exemplary embodiment of the present invention, transmit antenna 624 may be configured to transmit power within its near-field only if at least one device is within the near-field and at least one device is in need of a charge.

Placing a transmit antenna proximate a storage area wherein the transmit antenna has a substantially similar shape of the storage area may enable for improved wireless charging efficiency of a device (e.g., a cellular telephone) placed in the storage area. More specifically, because a device (e.g. a cellular telephone) placed in a storage area (e.g., storage area 626) may be passively aligned by the shape of the storage area, a device within the storage area may be substantially aligned with the transmit antenna and charging efficiency may be increased.

Figure 16:
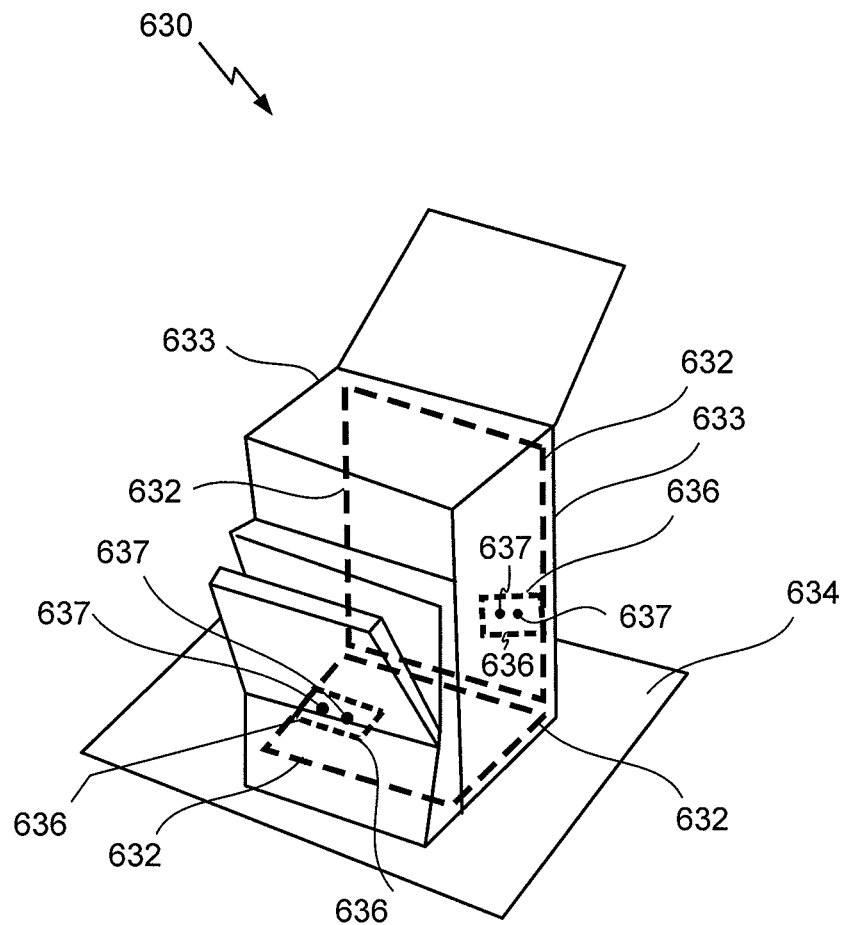
FIG. 16 depicts a portable charging system having one or more receive antennas, in accordance with an exemplary embodiment of the present invention.

FIG. 16 illustrates another charging system 630 including one or more receive antennas 632 integrated within a portable device illustrated as a bag 633, in accordance with one or more exemplary embodiments of the present invention. Each receive antenna 632 may be configured to receive power via receive circuitry 302 (see FIG. 7) from a charging source, such as an external transmit antenna 634. By way of example only, each receive antenna 632 may be configured to receive power from transmit antenna 634, which may be integrated within, attached to, and/or positioned on a table (not shown). Charging system 630 may also include one or more connection ports 636 having one or more connectors 637. Each connection port 636 may be positioned with an associated charging area and may be operably coupled to at least one receive antenna 632. Further, one or more connectors 637 may be configured to couple to a charging port of a device (e.g., a camera, cellular telephone, or a media player). As configured, each connection port 636 may provide power received from a receive antenna to a device operably coupled thereto. According to one exemplary embodiment of the present invention, connection ports 636 may be configured to draw power from a charging source only if at least one device is coupled to one or more connectors 637 and the at least one device is in need of a charge.

Figure 17:
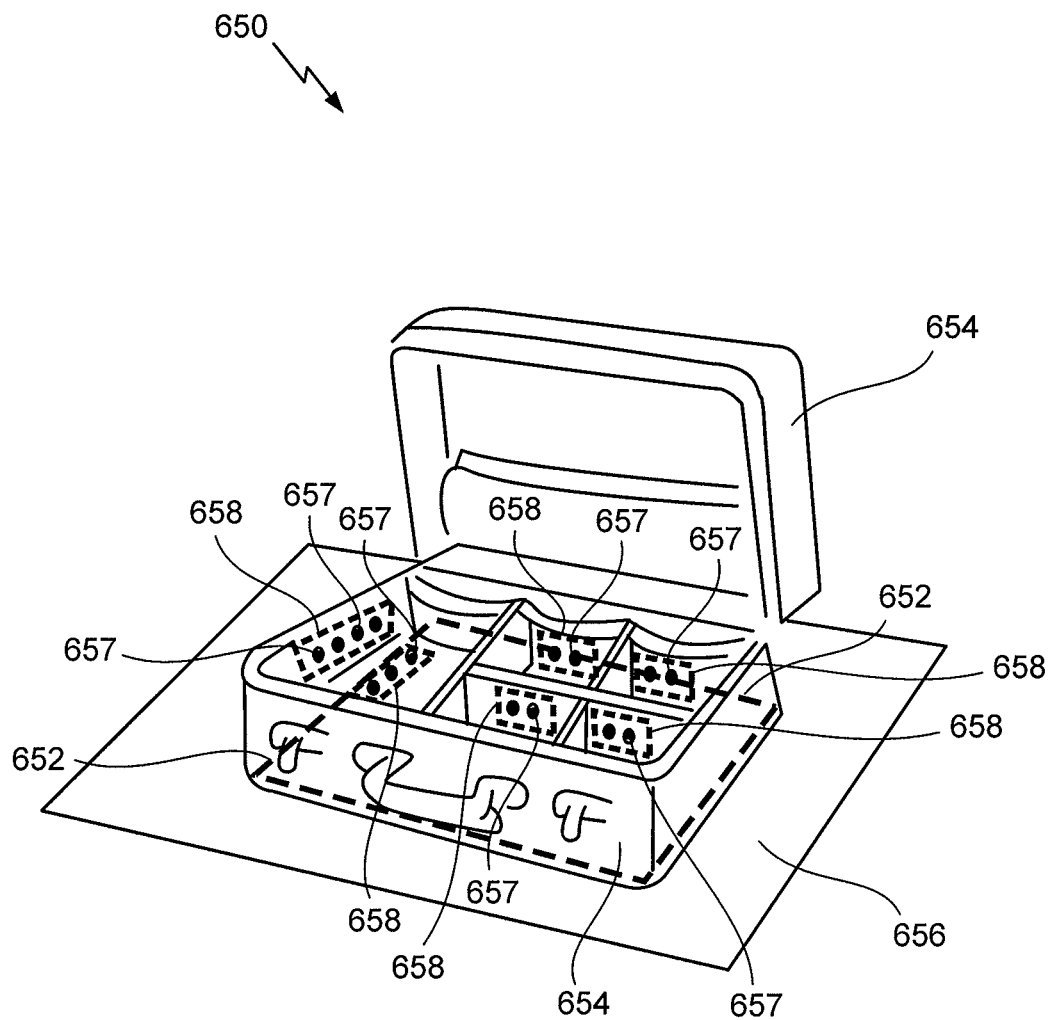
FIG. 17 depicts another portable charging system having one or more receive antennas, according to an exemplary embodiment of the present invention.

Another charging system 650, according to one or more exemplary embodiments of the present invention, is illustrated in FIG. 17. Charging system 650 includes one or more wireless receive antennas 652 integrated within a bag 654, and an external wireless transmit antenna 656. Charging system 650 may also include one or more connection ports 658 having one or more connectors 657. Each connection port 658 may be operably coupled to at least one receive antenna 652 and may further be configured to couple one or more connectors 657 to a charging port of a device (e.g., a camera, cellular telephone, or a media player). Additionally, each connection port 658 may be positioned within an associated storage area and may be configured to provide power received from a receive antenna to a device operably coupled thereto. It is noted that, according to one exemplary embodiment of the present invention, connection port 658 may be configured to draw power from a charging source only if at least one device is coupled to one or more connectors 657 associated with connection port 658, and the at least one device is in need of a charge.

The exemplary embodiments described above may enable a device (e.g., a camera, cellular telephone, or a media player) user to simultaneously charge one or more devices while transporting a portable apparatus having the one or more chargeable devices therein. Further, the above described exemplary embodiments may enable a device user to simultaneously charge one or more devices within a portable apparatus without any need to remove any device from the portable apparatus. It is noted that, although the portable charging systems described above include portable bags, a portable charging system having any known and suitable portable apparatus is within the scope of the present invention.

Figure 18:
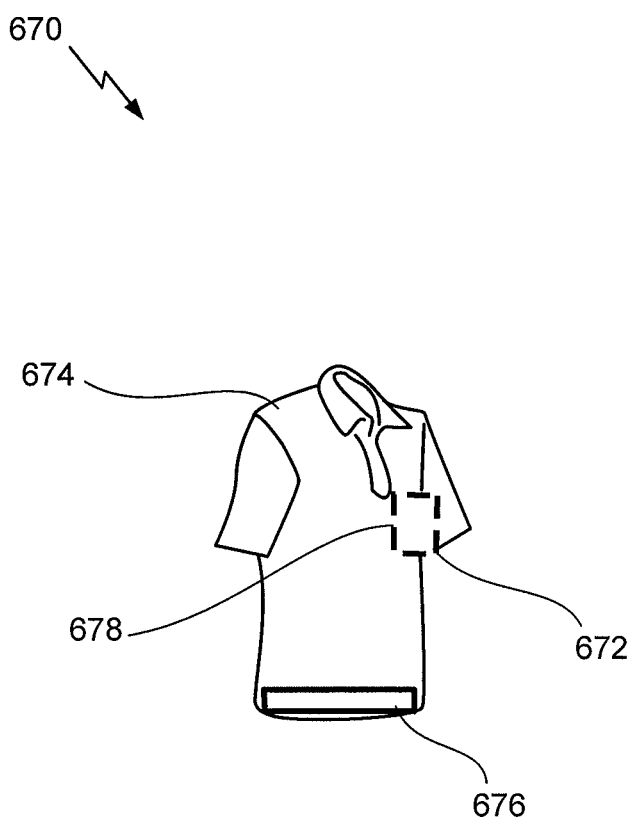
FIG. 18 illustrates a portable charging system including at least one antenna integrated within an article of clothing, in accordance with an exemplary embodiment of the present invention.

FIG. 18 illustrates yet another portable charging system 670 including a transmit antenna 672 integrated within a portable device such as an article of clothing 674, in accordance with one or more exemplary embodiments of the present invention. As illustrated in FIG. 18, article of clothing 674 may include transmit antenna 672 positioned proximate a storage area 678 (e.g., a pocket) within article of clothing 674 and configured to hold a device. Furthermore, charging system 670 may include a battery 676 integrated within article of clothing 676. In one contemplated operation, battery 676 may be charged prior to article of clothing 674 being worn by an individual. Although article of clothing 674 is illustrated in FIG. 18 as a shirt, any article of clothing may be within the scope of the invention. By way of example and not limitation, article of clothing 674 may include a shirt, a pair of pants, a coat, a shoe, or any wearable accessory.

Transmit antenna 672 may be configured to receive power from energy storage module 676 in any known and suitable wireless or wired manner. Furthermore, transmit antenna 672 may be configured to transmit power within a near-field of transmit antenna 672. The transmitted power may then be received by a receive antenna (not shown) within a coupling-mode region of the receive antenna and transmit antenna 672. For example, power transmitted from transmit antenna 672 may be received by a receive antenna coupled to a battery of a device (not shown) positioned within storage area 678. As an example, while an individual is wearing article of clothing 674, one or more devices positioned within storage area 678 and proximate transmit antenna 672 may wirelessly receive power, via receive circuitry 302, from battery 676 via transmit circuitry 202 and transmit antenna 672.

As described above with reference to FIG. 15, placing a transmit antenna proximate a storage area (e.g., a pocket) wherein the transmit antenna has a substantially similar shape of the storage area may enable for improved wireless charging efficiency of a device (e.g., a cellular telephone) placed in the storage area. More specifically, because a device (e.g. a cellular telephone) placed in a storage area (e.g., storage area 678) may be passively aligned by the shape of the storage area, a device within the storage area may be substantially aligned with the transmit antenna and charging efficiency may be increased. It is noted that transmit antenna 672 may be configured to transmit power within a respective near-field only if at least one device is within the near-field and the at least one device is in need of a charge.

Figure 19:
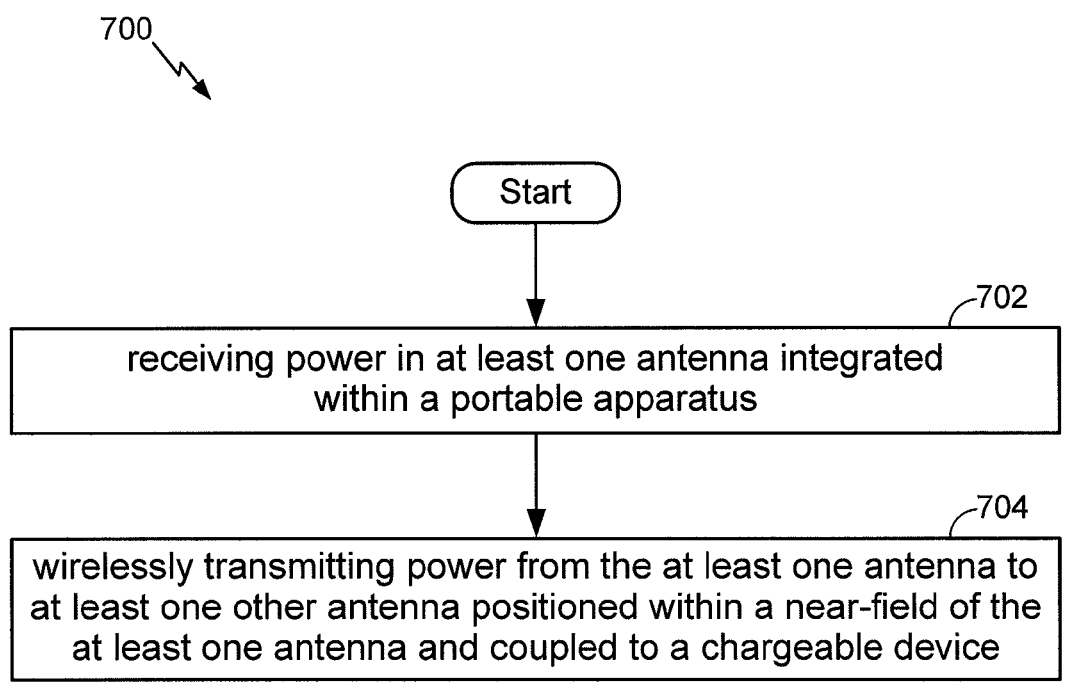
FIG. 19 is a flowchart illustrating a method of charging a chargeable device, in accordance with an exemplary embodiment of the present invention.

FIG. 19 is a flowchart illustrating a method 700 of charging a chargeable device, in accordance with one or more exemplary embodiments. Method 700 may include receiving power in at least one antenna integrated within a portable apparatus (depicted by numeral 702). Method 700 may further include wirelessly transmitting power from the at least one antenna to at least one other antenna positioned within a near-field of the at least one antenna and coupled to a chargeable device (depicted by numeral 704).

Figure 20:
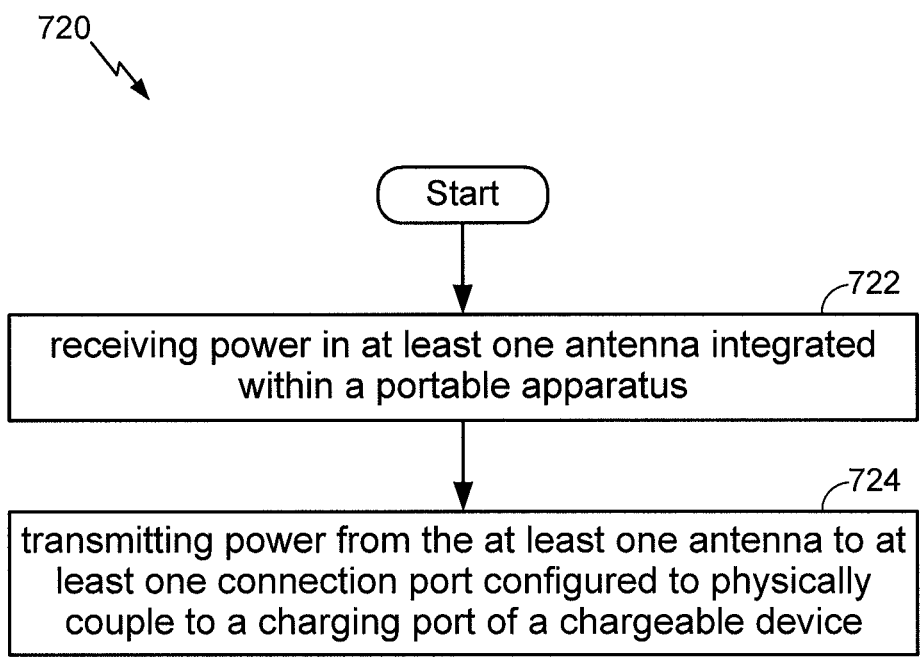
FIG. 20 is a flowchart illustrating another method of charging a chargeable device, in accordance with an exemplary embodiment of the present invention.

FIG. 20 is a flowchart illustrating another method 720 of charging a chargeable device, according to one or more exemplary embodiments. Method 720 may include receiving power in at least one antenna integrated within a portable apparatus (depicted by numeral 722). Furthermore, method 720 may include transmitting power from the at least one antenna to at least one connection port configured to physically couple to a charging port of a chargeable device (depicted by numeral 724).

It is further noted that a "portable device," as described herein, may comprise a device that is configured to receive a chargeable device and at least partially surround the chargeable device. Stated another way, a "portable device" may comprise a device configured to encompass more than one surface of a chargeable device.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A portable charging apparatus, comprising:
   a storage area configured to receive an electronic device;
   an antenna circuit configured to wirelessly receive power from a power source at a level sufficient to charge or power the electronic device, wherein the antenna circuit comprises a plurality of antennas, wherein a plane of at least one antenna is angled in at least two different directions relative to a plane of at least one other antenna;
   a receive circuit electrically connected to the antenna circuit and configured to receive at least a portion of the received power; and
   a connection port electrically connected to the receive circuit, the connection port positioned in the storage area for physically coupling to the electronic device and configured to charge or power the electronic device based at least on the portion of the received power.

2. The apparatus of claim 1, wherein the antenna circuit comprises a multi-turn antenna configured to wirelessly receive the transmitted power.

3. The apparatus of claim 1, wherein the receive circuit comprises:
   a power conversion circuit configured to receive power from the antenna circuit and to convert the power from the antenna circuit into power to charge or power the electronic device; and
   a switch configured to selectively connect the power conversion circuit to the antenna circuit.

4. The apparatus of claim 3, wherein the power conversion circuit comprises an RF-DC converter configured to convert the power from the antenna circuit into a non-alternating power.

5. The apparatus of claim 1, wherein the portable device comprises one of a purse, a backpack, a piece of luggage, or a briefcase.

6. The apparatus of claim 1, wherein the electronic device comprises a cellular telephone, a camera, a media player, a gaming device, a tool, a navigation device, a headset, or a toy.

7. The apparatus of claim 1, wherein the connection port is configured to draw power from the receive circuit only if the electronic device is physically coupled to the connection port.

8. The apparatus of claim 1, wherein the connection port is configured to draw power from the receive circuit only if the electronic device is physically coupled to the connection port and the electronic device is need of a charge.

9. A method of wireless charging, the method comprising:
   receiving a physical coupling of an electronic device to a connection port positioned within a storage area of a portable charging device;
   wirelessly receiving power from a power source by an antenna circuit, wherein the antenna circuit comprises a plurality of antennas, wherein a plane of at least one antenna is angled in at least two different directions relative to a plane of at least one other antenna, the received power at a level sufficient to charge or power the electronic device; and
   charging or powering the electronic device via the connection port based on at least a portion of the received power.

10. The method of claim 9, further comprising receiving the transmitted power with a multi-turn antenna.

11. The method of claim 9, further comprising:
    providing the received power to a power conversion circuit from the antenna circuit;
    converting the power received from the antenna circuit into power for charging or powering the electronic device via the power conversion circuit; and
    selectively connecting the power conversion circuit to the antenna circuit.

12. The method of claim 11, further comprising converting the power from the antenna circuit into a non-alternating power.

13. The method of claim 11, wherein the power conversion circuit comprises an RF-DC converter.

14. The method of claim 9, wherein the portable charging device comprises one of a purse, a backpack, a piece of luggage, or a briefcase.

15. The method of claim 9, further comprising drawing power by the connection port only if the electronic device is physically coupled to the connection port.

16. The method of claim 9, further comprising drawing power by the connection port only if the electronic device is physically coupled to the connection port and the electronic device is need of a charge.

17. A portable charging apparatus, comprising:
    means for storing an electronic device;
    means for wirelessly receiving power from a power source at a level sufficient to charge or power the electronic device, wherein the means for wirelessly receiving power comprises a plurality of means for wirelessly receiving power, wherein a plane of at least one of the plurality of means for wirelessly receiving power is angled in at least two different directions relative to a plane of at least one other of the plurality of means for wirelessly receiving power; and means for physically coupling to the electronic device, the coupling means positioned in the means for storing and comprising means for charging or powering the electronic device based at least on at least a portion of the received power received from the receiving means.

18. The apparatus of claim 17, wherein the receiving means comprises an antenna circuit.

19. The apparatus of claim 17, wherein the means for physically coupling to the electronic device comprises a connection port.

20. The apparatus of claim 17, wherein the receiving means comprises a multi-turn antenna.

21. The apparatus of claim 17, further comprising:
means for converting power received from the receiving means into power for charging or powering the electronic device; and
means for selectively connecting the converting means to the receiving means.

22. The apparatus of claim 21, wherein the converting means comprises a power conversion circuit, and the selectively connecting means comprises a switch.

23. The apparatus of claim 21, wherein the converting means is configured to convert the power from receiving means into a non-alternating power.

24. The apparatus of claim 23, wherein the converting means comprises an RF-DC converter.

25. The apparatus of claim 17, wherein the means for storing the electronic device comprises one of a purse, a backpack, a piece of luggage, or a briefcase.

26. The apparatus of claim 17, wherein the electronic device comprises at least one of a cellular telephone, a camera, a media player, a gaming device, a tool, a navigation device, a headset, or a toy.

27. The apparatus of claim 17, wherein the coupling means further comprises means for drawing power only if the electronic device is physically coupled to the coupling means.

28. The apparatus of claim 17, wherein the coupling means further comprises means for drawing power only if the electronic device is coupled to the coupling means and the electronic device is need of a charge.

* * * * *